US012167414B2

(12) United States Patent
Huang et al.

(10) Patent No.: US 12,167,414 B2
(45) Date of Patent: Dec. 10, 2024

(54) FRAMEWORK FOR INDICATION OF AN OVERLAP RESOLUTION PROCESS

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/679,671

(22) Filed: Feb. 24, 2022

(65) Prior Publication Data
US 2023/0269740 A1    Aug. 24, 2023

(51) Int. Cl.
*H04W 72/23* (2023.01)
*H04W 72/566* (2023.01)

(52) U.S. Cl.
CPC ......... *H04W 72/23* (2023.01); *H04W 72/569* (2023.01)

(58) Field of Classification Search
CPC ............... H04L 5/0053; H04W 72/23; H04W 72/569; H04W 72/1268; H04W 72/231; H04W 72/566; H04W 72/232
See application file for complete search history.

(56) References Cited

U.S. PATENT DOCUMENTS

| | | | | |
|---|---|---|---|---|
| 2017/0104620 A1* | 4/2017 | Kim | ...................... | H04W 40/22 |
| 2023/0224095 A1* | 7/2023 | Bae | ...................... | H04L 1/1854 370/329 |
| 2023/0224950 A1* | 7/2023 | Yin | ...................... | H04L 1/1854 370/329 |
| 2023/0247635 A1* | 8/2023 | Yin | ...................... | H04W 72/54 370/329 |
| 2023/0354360 A1* | 11/2023 | Oteri | .................. | H04W 72/232 |
| 2023/0361924 A1* | 11/2023 | Lei | ........................ | H04L 1/1664 |

(Continued)

OTHER PUBLICATIONS

International Search Report and Written Opinion—PCT/US2023/062826—ISA/EPO—Jun. 7, 2022.

(Continued)

*Primary Examiner* — Brian D Nguyen
(74) *Attorney, Agent, or Firm* — Holland & Hart LLP

(57) ABSTRACT

Methods, systems, and devices for wireless communications are described. A user equipment (UE) may receive a first indication of a default overlap resolution process for application by the UE on a plurality of overlapping transmissions. The plurality of overlapping transmissions may be collectively scheduled by one or more first downlink control information (DCI) messages received by the UE prior to a processing deadline for multiplexing the plurality of overlapping transmissions. The UE may determine, based on the processing deadline having passed, whether any one of the one or more first downlink control information messages includes a second indication of a transmission-specific overlap resolution process for application by the UE on a first two or more overlapping transmissions of the plurality of overlapping transmissions. The UE may perform a determined overlap resolution process including either the transmission-specific overlap resolution process or the default overlap resolution process.

27 Claims, 21 Drawing Sheets

(56) References Cited

U.S. PATENT DOCUMENTS

2024/0063951 A1* 2/2024 Yin .................. H04L 1/1861
2024/0146466 A1* 5/2024 Yin .................. H04L 1/1854

OTHER PUBLICATIONS

Qualcomm Incorporated: "Intra-UE Multiplexing and Prioritization for IOT and URLLC", 3GPP TSG RAN WG1 #107-e, R1-2112211, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, 25 Pages, XP052075317, Section 2, p. 1-p. 3.

ZTE: "Discussion on Enhanced Intra-UE Multiplexing", 3GPP TSG RAN WG1 #106bis-e, R1-2110916, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, 22 Pages, XP052074658, Section 2.2, p. 5.

* cited by examiner

FRAMEWORK FOR INDICATION OF AN OVERLAP RESOLUTION PROCESS

FIELD OF TECHNOLOGY

The following relates to wireless communications, including a framework for indication of an overlap resolution process.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE). In some wireless communications systems, a network (e.g., one or more network entities) may schedule a UE to transmit wireless communications over multiple channels that overlap in time.

SUMMARY

The described techniques relate to improved methods, systems, devices, and apparatuses that support a framework for indication of an overlap resolution process. For example, the described techniques provide for dynamic configuration of a user equipment (UE) with an overlap resolution process. The UE may receive a first indication of a default overlap resolution process for application by the UE on a plurality of overlapping transmissions. The plurality of overlapping transmissions may be collectively scheduled by one or more first downlink control information (DCI) messages of a plurality of DCI messages received by the UE prior to a processing deadline for multiplexing the plurality of overlapping transmissions. The UE may determine, based on the processing deadline having passed, whether any one of the one or more first DCI messages includes a second indication of a transmission-specific overlap resolution process for application by the UE on a first two or more overlapping transmissions of the plurality of overlapping transmissions. The UE may perform a determined overlap resolution process including either the transmission-specific overlap resolution process indicated by one of the one or more first DCI messages or the default overlap resolution process. As a result, the UE may reduce latency and increase reliability of wireless communications.

A method for wireless communication at a UE is described. The method may include receiving a first indication of a default overlap resolution process for application by the UE on a set of multiple overlapping transmissions, receiving one or more first DCI messages of a set of multiple DCI messages that collectively schedule the set of multiple overlapping transmissions, determining, based on a processing deadline having passed for multiplexing the set of multiple overlapping transmissions, the one or more first DCI messages received prior to the processing deadline, whether any one of the one or more first DCI messages includes a second indication of a transmission-specific overlap resolution process for application by the UE on a first two or more overlapping transmissions of the set of multiple overlapping transmissions, and performing a determined overlap resolution process including either the transmission-specific overlap resolution process indicated by one of the one or more first DCI messages or the default overlap resolution process.

An apparatus for wireless communication at a UE is described. The apparatus may include a processor, memory coupled with the processor, and instructions stored in the memory. The instructions may be executable by the processor to cause the apparatus to receive a first indication of a default overlap resolution process for application by the UE on a set of multiple overlapping transmissions, receive one or more first DCI messages of a set of multiple DCI messages that collectively schedule the set of multiple overlapping transmissions, determine, based on a processing deadline having passed for multiplexing the set of multiple overlapping transmissions, the one or more first DCI messages received prior to the processing deadline, whether any one of the one or more first DCI messages includes a second indication of a transmission-specific overlap resolution process for application by the UE on a first two or more overlapping transmissions of the set of multiple overlapping transmissions, and perform a determined overlap resolution process including either the transmission-specific overlap resolution process indicated by one of the one or more first DCI messages or the default overlap resolution process.

Another apparatus for wireless communication at a UE is described. The apparatus may include means for receiving a first indication of a default overlap resolution process for application by the UE on a set of multiple overlapping transmissions, means for receiving one or more first DCI messages of a set of multiple DCI messages that collectively schedule the set of multiple overlapping transmissions, means for determining, based on a processing deadline having passed for multiplexing the set of multiple overlapping transmissions, the one or more first DCI messages received prior to the processing deadline, whether any one of the one or more first DCI messages includes a second indication of a transmission-specific overlap resolution process for application by the UE on a first two or more overlapping transmissions of the set of multiple overlapping transmissions, and means for performing a determined overlap resolution process including either the transmission-specific overlap resolution process indicated by one of the one or more first DCI messages or the default overlap resolution process.

A non-transitory computer-readable medium storing code for wireless communication at a UE is described. The code may include instructions executable by a processor to receive a first indication of a default overlap resolution process for application by the UE on a set of multiple overlapping transmissions, receive one or more first DCI messages of a set of multiple DCI messages that collectively schedule the set of multiple overlapping transmissions, determine, based on a processing deadline having passed for multiplexing the set of multiple overlapping transmissions, the one or more first DCI messages received prior to the processing deadline, whether any one of the one or more first DCI messages includes a second indication of a transmission-specific overlap resolution process for application by the UE on a first two or more overlapping transmissions of the set of multiple overlapping transmissions, and perform a determined overlap resolution process including either the transmission-specific overlap resolution process indicated by one of the one or more first DCI messages or the default overlap resolution process.

In some examples of the method, apparatuses, and non-transitory computer-readable medium described herein, determining whether any one of the one or more first DCI messages includes the second indication may include operations, features, means, or instructions for determining that a triggering DCI message of the one or more first DCI messages includes the second indication of the transmission-specific overlap resolution process, where the transmission-specific overlap resolution process may be the determined overlap resolution process based on the second indication being included in any of the one or more first DCI messages.

In some examples of the method, apparatuses, and non-transitory computer-readable medium described herein, the triggering DCI message may be a temporally last DCI message of the one or more first DCI messages.

In some examples of the method, apparatuses, and non-transitory computer-readable medium described herein, determining whether any one of the one or more first DCI messages includes the second indication may include operations, features, means, or instructions for determining that the one or more first DCI messages fail to include the second indication of the transmission-specific overlap resolution process, where the default overlap resolution process may be the determined overlap resolution process based on the second indication not being included in any of the one or more first DCI messages.

In some examples of the method, apparatuses, and non-transitory computer-readable medium described herein, performing the determined overlap resolution process may include operations, features, means, or instructions for performing one of a multiplexing process or a prioritization process as part of the determined overlap resolution process.

In some examples of the method, apparatuses, and non-transitory computer-readable medium described herein, performing one of the multiplexing process or the prioritization process may include operations, features, means, or instructions for performing the multiplexing process, which includes and multiplexing the set of multiple overlapping transmissions regardless of a priority index associated with each overlapping transmission of the set of multiple overlapping transmissions.

In some examples of the method, apparatuses, and non-transitory computer-readable medium described herein, performing one of the multiplexing process or the prioritization process may include operations, features, means, or instructions for performing the prioritization process, which includes and prioritizing each of the set of multiple overlapping transmissions based on a respective priority index associated with each overlapping transmission of the set of multiple overlapping transmissions.

Some examples of the method, apparatuses, and non-transitory computer-readable medium described herein may further include operations, features, means, or instructions for multiplexing at least two overlapping transmissions of the set of multiple overlapping transmissions, the at least two overlapping transmissions associated with a first priority index and refraining from transmitting remaining overlapping transmissions of the set of multiple overlapping transmissions, the remaining overlapping transmissions associated with a second priority index.

In some examples of the method, apparatuses, and non-transitory computer-readable medium described herein, refraining from transmitting the remaining overlapping transmissions may include operations, features, means, or instructions for dropping the remaining overlapping transmissions subsequent to the processing deadline.

In some examples of the method, apparatuses, and non-transitory computer-readable medium described herein, the first priority index corresponds to a high priority and the second priority index corresponds to a low priority which may be less than the high priority.

Some examples of the method, apparatuses, and non-transitory computer-readable medium described herein may further include operations, features, means, or instructions for determining that a second DCI message of the set of multiple DCI messages includes the second indication of the transmission-specific overlap resolution process, the second DCI message received after the processing deadline and scheduling an additional transmission of the set of multiple overlapping transmissions, determining that the second indication of the transmission-specific overlap resolution process included in the second DCI message indicates a prioritization process and that the determined overlap resolution process may be also the prioritization process, and performing the determined overlap resolution process for the additional transmission based on the determined overlap resolution process being the prioritization process and being consistent with the second indication included in the second DCI message.

In some examples of the method, apparatuses, and non-transitory computer-readable medium described herein, performing the determined overlap resolution process may include operations, features, means, or instructions for performing the prioritization process, which includes, prioritizing each of the set of multiple overlapping transmissions based on a respective priority index associated with each overlapping transmission of the set of multiple overlapping transmissions, and multiplexing at least two overlapping transmissions of the set of multiple overlapping transmissions based on the second DCI message being received prior to a second processing deadline, where the at least two overlapping transmissions may be associated with a first priority index.

Some examples of the method, apparatuses, and non-transitory computer-readable medium described herein may further include operations, features, means, or instructions for determining that a second DCI message of the set of multiple DCI messages includes the second indication of the transmission-specific overlap resolution process, the second DCI message received after the processing deadline and scheduling an additional transmission of the set of multiple overlapping transmissions, determining that the second indication of the transmission-specific overlap resolution process included in the second DCI message indicates a prioritization process and that the determined overlap resolution process may be a multiplexing process, and refraining from transmitting the additional transmission and from monitoring for one or more additional DCI messages based on the determined overlap resolution process being the multiplexing process and being inconsistent with the second indication included in the second DCI message.

Some examples of the method, apparatuses, and non-transitory computer-readable medium described herein may further include operations, features, means, or instructions for determining that a second DCI message of the set of multiple DCI messages includes the second indication of the transmission-specific overlap resolution process, the second DCI message received after the processing deadline and scheduling an additional transmission of the set of multiple overlapping transmissions, determining that the second indication of the transmission-specific overlap resolution process included in the second DCI message indicates a multiplexing process, and refraining from transmitting the additional transmission and from monitoring for one or more additional DCI messages based on the second indication of the transmission-specific overlap resolution process included in the second DCI message indicating a multiplexing process.

A method for wireless communication at a network entity is described. The method may include outputting a radio resource control (RRC) message including a first indication of a default overlap resolution process for application by a UE on a set of multiple overlapping transmissions and outputting one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions.

An apparatus for wireless communication at a network entity is described. The apparatus may include a processor, memory coupled with the processor, and instructions stored in the memory. The instructions may be executable by the processor to cause the apparatus to output an RRC message including a first indication of a default overlap resolution process for application by a UE on a set of multiple overlapping transmissions and output one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions.

Another apparatus for wireless communication at a network entity is described. The apparatus may include means for outputting an RRC message including a first indication of a default overlap resolution process for application by a UE on a set of multiple overlapping transmissions and means for outputting one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions.

A non-transitory computer-readable medium storing code for wireless communication at a network entity is described. The code may include instructions executable by a processor to output an RRC message including a first indication of a default overlap resolution process for application by a UE on a set of multiple overlapping transmissions and output one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions.

Some examples of the method, apparatuses, and non-transitory computer-readable medium described herein may further include operations, features, means, or instructions for determining that a first DCI message of the set of multiple DCI messages may be a temporally last DCI message before a processing deadline of the UE, where the first DCI message triggers the UE to perform the transmission-specific overlap resolution process on the first two or more overlapping transmissions.

Some examples of the method, apparatuses, and non-transitory computer-readable medium described herein may further include operations, features, means, or instructions for outputting a second DCI message of the one or more DCI messages that includes the second indication of the transmission-specific overlap resolution process, where the second DCI message triggers the UE to perform the transmission-specific overlap resolution process on an additional transmission scheduled by the second DCI message based on the second DCI message being received at the UE after the processing deadline, and the second indication of the transmission-specific overlap resolution process included in both the second DCI message and the first DCI message indicating a prioritization process.

Some examples of the method, apparatuses, and non-transitory computer-readable medium described herein may further include operations, features, means, or instructions for outputting a second DCI message of the one or more DCI messages that includes the second indication of the transmission-specific overlap resolution process, where the second DCI message triggers the UE to refrain from transmitting an additional transmission scheduled by the second DCI message and from monitoring for one or more additional DCI messages based on the second DCI message being received at the UE after the processing deadline, the second indication of the transmission-specific overlap resolution process included in the second DCI message indicating a prioritization process, and the second indication of the transmission-specific overlap resolution process included in the first DCI message indicating a multiplexing process.

Some examples of the method, apparatuses, and non-transitory computer-readable medium described herein may further include operations, features, means, or instructions for outputting a second DCI message of the one or more DCI messages that includes the second indication of the transmission-specific overlap resolution process, where the second DCI message triggers the UE to refrain from transmitting an additional transmission scheduled by the second DCI message and from monitoring for one or more additional DCI messages based on the second DCI message being received at the UE after the processing deadline and the second indication of the transmission-specific overlap resolution process indicating a multiplexing process.

In some examples of the method, apparatuses, and non-transitory computer-readable medium described herein, the radio resource control message triggers the UE to perform the default overlap resolution process based at least in part on the UE failing to receive a DCI message of the one or more DCI messages that includes the second indication of the transmission-specific overlap resolution process prior to a processing deadline.

In some examples of the method, apparatuses, and non-transitory computer-readable medium described herein, the transmission-specific overlap resolution process includes either a multiplexing process or a prioritization process.

In some examples of the method, apparatuses, and non-transitory computer-readable medium described herein, the transmission-specific overlap resolution process includes the multiplexing process and the multiplexing process includes multiplexing the set of multiple overlapping transmissions regardless of a priority index associated with each overlapping transmission of the set of multiple overlapping transmissions.

In some examples of the method, apparatuses, and non-transitory computer-readable medium described herein, the transmission-specific overlap resolution process includes the prioritization process and the prioritization process includes prioritizing each of the set of multiple overlapping transmissions based on a respective priority index associated with each overlapping transmission of the set of multiple overlapping transmissions.

In some examples of the method, apparatuses, and non-transitory computer-readable medium described herein, the prioritization process further includes multiplexing at least two overlapping transmissions of the set of multiple overlapping transmissions, the at least two overlapping transmissions associated with a first priority index, and refraining from transmitting remaining overlapping transmissions of the set of multiple overlapping transmissions, the remaining overlapping transmissions associated with a second priority index.

Some examples of the method, apparatuses, and non-transitory computer-readable medium described herein may further include operations, features, means, or instructions for refraining from transmitting the remaining overlapping transmissions includes dropping the remaining overlapping transmissions subsequent to a processing deadline.

In some examples of the method, apparatuses, and non-transitory computer-readable medium described herein, the first priority index corresponds to a high priority and the second priority index corresponds to a low priority which may be less than the high priority.

DETAILED DESCRIPTION

Figure 1:
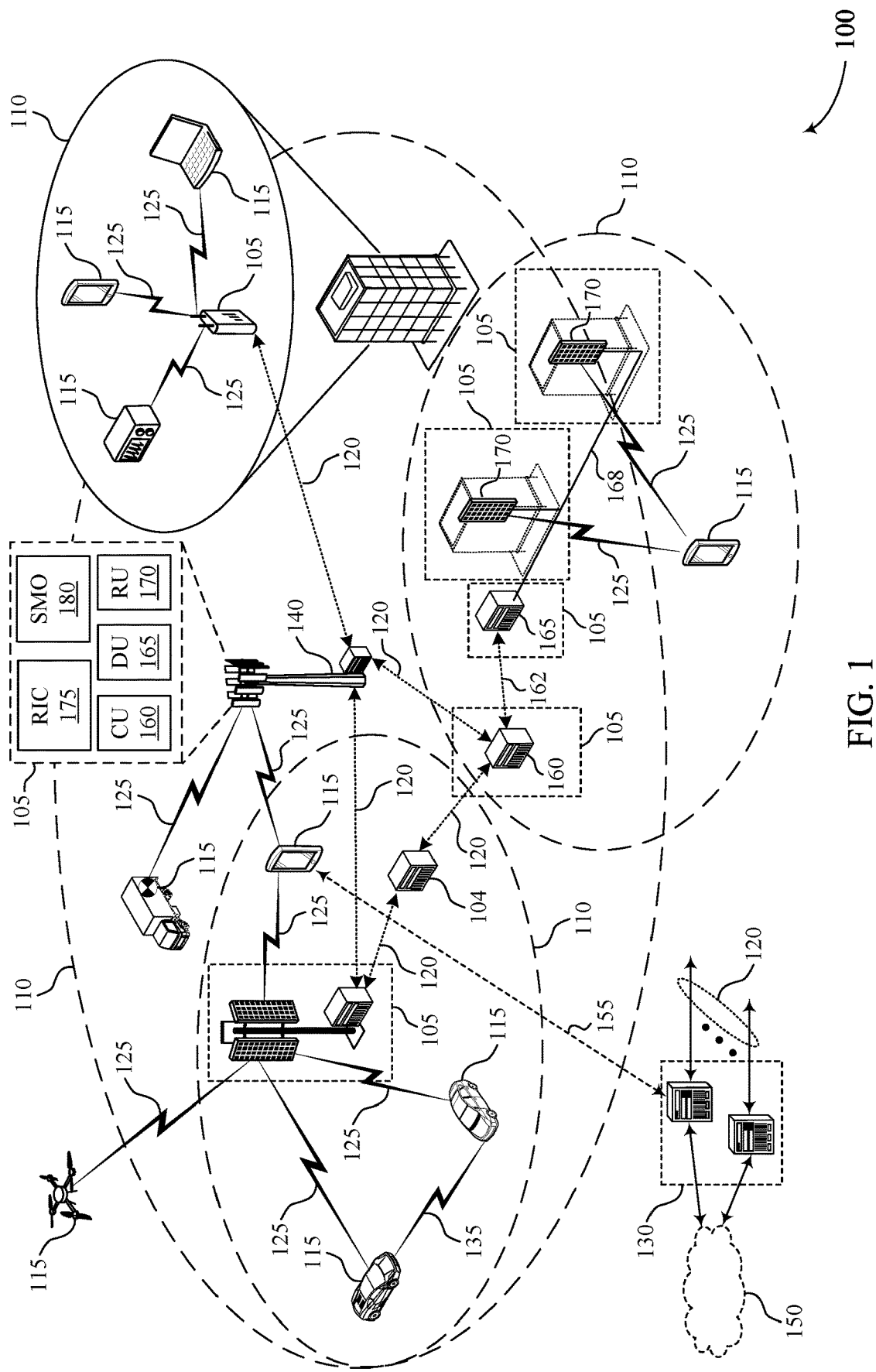
FIGS. 1 and 2 each illustrate an example of a wireless communications system that supports a framework for indication of an overlap resolution process in accordance with one or more aspects of the present disclosure.

A wireless communications system may include one or more communication devices, such as a user equipment (UE) or a network entity. A network entity may be an example of a wired or wireless network node that may support multiple radio access technologies (RATs). In some examples, a network entity may be an example of a base station (e.g., an eNodeB (eNB), a next-generation NodeB or a giga-NodeB, any of which may be referred to as a gNB, or some other base station). Examples of radio access technologies may include 4G systems, such as Long Term Evolution (LTE) systems, and 5G systems, which may be referred to as 5G new radio (NR) systems, among other wireless communications systems (e.g., subsequent generations of wireless communications systems). A communication device may support wireless communication over one or multiple channels. For example, the network (e.g., one or more network entities) may schedule the communication device to transmit wireless communications over multiple channels that overlap in time.

In some examples, the overlapping channels may be associated with different priorities. For example, some channels may be associated with relatively low priority transmissions (e.g., enhanced mobile broadband (eMBB) traffic) and other channels may be associated with relatively high priority transmissions (e.g., ultra-low-latency (URLLC) traffic). To resolve conflicts between the overlapping channels, the network (e.g., one or more network entities) may configure the UE to perform an overlap resolution process.

For example, the network may configure the UE to perform an overlap resolution process in which the UE may multiplex transmissions based on priority. That is, the network may configure the UE to multiplex relatively high priority transmissions and refrain from transmitting (e.g., drop, cancel) relatively low priority transmissions. In other examples, the network may configure the UE to perform an overlap resolution process in which the UE may multiplex transmissions regardless of priority. That is, the network may configure the UE to multiplex relatively high priority transmissions with relatively low priority transmissions. In some examples, the network may configure the UE to perform an overlap resolution process semi-statically, such as through radio resource control (RRC) signaling. However, the periodicity (e.g., frequency) of semi-static indications may be prohibitive due to an increased processing time for multiplexing transmissions of different priorities.

Various aspects of the present disclosure relate to a framework for indication of an overlap resolution process and more specifically, to dynamic configuration of a communications device (e.g., a UE) with an overlap resolution process. For example, the network may semi-statically (e.g., via RRC signaling) configure the UE with a default overlap resolution process. Additionally, or alternatively, the network (e.g., one or more network entities) may transmit dynamic indications, such as through DCI (DCI), scheduling transmissions for the UE. Within the DCI, the network may include an indication of an overlap resolution process. In some examples, if the UE receives a DCI that includes the indication of an overlap resolution process the UE may determine to use the overlap resolution process indicated by the DCI message, for example, rather than the default overlap resolution process. That is, in some examples, the overlap resolution process indicated via DCI signaling may supersede (e.g., override, take priority over) the overlap resolution process indicated via RRC signaling. In some examples, the determination by the UE to use the overlap resolution process indicated by the DCI message rather than the overlap resolution process indicated via RRC signaling may be based on whether the DCI was received prior to a processing deadline.

In some examples, the UE may receive multiple DCI messages prior to the processing deadline that may each include an indication of the overlap resolution processes. In such examples, the UE may determine to use the overlap resolution process indicated by the last DCI message of the multiple DCI messages received prior to the processing deadline. In some examples, the UE may receive one or more additional DCI messages after the processing deadline that may each include an indication of an overlap resolution process. In such examples, the UE may determine whether to perform the overlap resolution process on an additional transmission scheduled by the additional DCI or to drop the additional transmission and refrain from monitoring for additional DCI.

Particular aspects of the subject matter described herein may be implemented to realize one or more of the following potential advantages. For example, the techniques employed by the described communication devices may provide benefits and enhancements to wireless communication devices operating within the network, including enabling dynamic configuration of the communication devices with an overlap resolution process. In some examples, operations performed by the described communication devices may provide improvements to techniques for resolving conflicts between overlapping channels thereby reducing latency and increasing the reliability of communications between the network and the communication devices. The operations performed by the described communication devices to improve techniques for resolving conflicts between overlapping channels may include indicating an overlap resolution process to the communication device via DCI messages that schedule overlapping transmissions for the communication devices. In some other implementations, operations performed by the described communication devices may also support improvements to user experience and higher data rates, among other benefits.

Aspects of the disclosure are initially described in the context of wireless communications systems. Aspects of the disclosure are also described in the context of process diagrams, procedures, and a process flow. Aspects of the disclosure are further illustrated by and described with reference to apparatus diagrams, system diagrams, and flowcharts that relate to a framework for indication of an overlap resolution process.

FIG. 1 illustrates an example of a wireless communications system 100 that supports a framework for indication of an overlap resolution process in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some examples, network entities 105 and UEs 115 may wirelessly communicate via one or more communication links 125. For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a base station 140) may be implemented in an aggregated or monolithic base station architecture, or alternatively, in a disaggregated base station architecture. For example, a network entity 105 may include one or more of a central unit (CU) 160, a distributed unit (DU) 165, a radio unit (RU) 170, a Radio Access Network (RAN) Intelligent Controller (MC) 175 (e.g., a Near-Real Time MC (Near-RT MC), a Non-Real Time MC (Non-RT MC), a Service Management and Orchestration (SMO) 180 system, or any combination thereof. An RU 170 may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU 160, a DU 165, and an RU 175 is flexible and may support different functionalities depending upon which functions (e.g., network layer functions, protocol layer functions, baseband functions, radio frequency functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (IAB) network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 (e.g., one or more RUs 170) may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support a framework for indication of an overlap resolution process as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 170, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, an RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of a radio frequency spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_{max}$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support techniques for dynamically configuring a UE 115 with an overlap resolution process. For example, the UE 115 may receive a first indication of a default overlap resolution process for application by the UE 115 on a plurality of overlapping transmissions. The plurality of overlapping transmission may be collectively scheduled by one or more first DCI messages of a plurality of DCI messages received by the UE 115 prior to a processing deadline. The processing deadline may be for multiplexing the plurality of overlapping transmissions. The UE 115 may determine, based on the processing deadline having passed, whether any one of the one or more DCI messages includes a second indication of a transmission-specific overlap resolution process for application by the UE 115 on a first two or more overlapping transmissions of the plurality of overlapping transmissions. The UE 115 may perform a determined overlap resolution process including either the transmission-specific overlap resolution process indicated by one of the one or more first DCI messages or the default overlap resolution process. As a result, the UE 115 may reduce latency and increase reliability of wireless communications.

Figure 2:
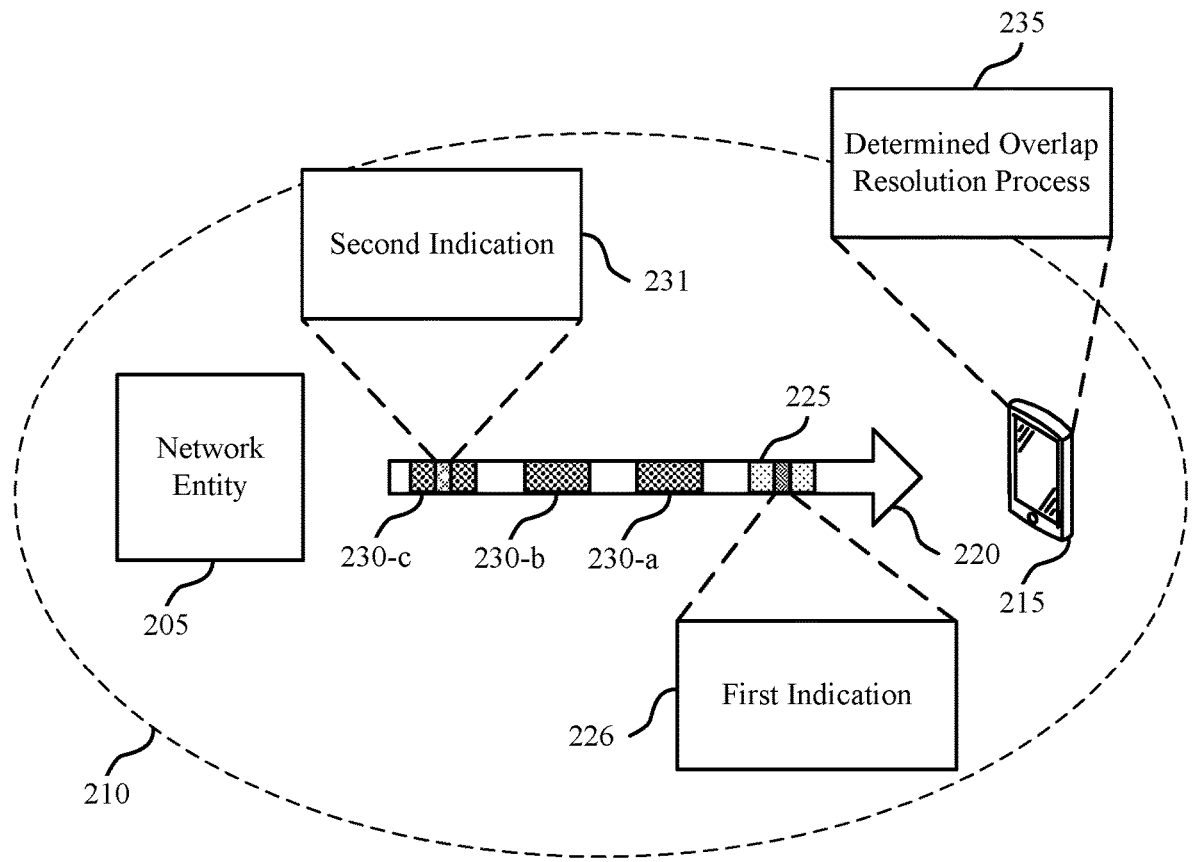

FIG. 2 illustrates an example of a wireless communications system 200 that supports a framework for indication of an overlap resolution process in accordance with one or more aspects of the present disclosure. The wireless communications system 200 may implement or be implemented by one or more aspects of the wireless communications system 100. For example, the wireless communications system 200 may include a network entity 205 and a UE 215, which may be examples of the corresponding devices as described with reference to FIG. 1. In the example of FIG. 2, the network entity 205 may be an example of a base station 140, a CU 160, a DU 165, or an RU 170 as described with reference to FIG. 1. The UE 215 and the network entity 205 may communicate within a coverage area 210, which may be an example of a coverage area 110 as described with reference to FIG. 1. The UE 215 may communicate with the network entity 205 over a communication link 220, which may be an example of a communication link 125 as described with reference to FIG. 1. In the example of FIG. 2, the communication link 220 may be a downlink.

A communication device (e.g., the UE 215) may support wireless communication over one or multiple channels. For example, the network entity 205 may schedule the UE 215 to transmit wireless communications over multiple channels that overlap in time. In some examples, the wireless communications may be associated with different priorities. For example, uplink transmissions (e.g., scheduled by the network entity 205) may be associated with a relatively high priority (e.g., corresponding to a priority index of 1 or another priority index greater than a priority index of a relatively low priority transmission) or a relatively low priority (e.g., corresponding to a priority index of 0 or another priority index less than a priority index of a relatively high priority transmission). In some examples, relatively low priority transmissions may include (e.g., may be used for) eMBB traffic and relatively high priority transmission may include (e.g., may be used for) URLLC traffic. In some examples, to resolve conflicts between the overlapping channels (e.g., associated with different priorities), the network (e.g., the network entity 205 or one or more other network entities 205, not shown) may configure the UE 215 to perform one or more overlap resolution processes.

For example, the network entity 205 may configure the UE 215 to perform an overlap resolution process in which the UE may multiplex transmissions based on priority. For example, the network entity 205 may configure the UE 215 to perform a prioritization process (e.g., a cancellation process) between relatively high priority channels and relatively low priority channels. In some examples of the prioritization process, if a relatively high priority channel and a relatively low priority channel overlap in time, the UE 215 may be configured to refrain from transmitting (e.g., drop, cancel) the relatively low priority channel and transmit the relatively high priority channel. That is, the network entity 205 may configure the UE 215 to multiplex relatively high priority transmissions and drop relatively the low priority transmissions (e.g., scheduled for transmission over the overlapping channels).

Additionally or alternatively, the network entity 205 may configure the UE 215 to perform an overlap resolution process in which the UE may multiplex transmissions regardless of priority. For example, the network entity 205 may configure the UE 215 to perform a multiplexing process (e.g., intra-UE multiplexing) between relatively high priority channels and relatively low priority channels. In some examples of the multiplexing process (e.g., between the relatively high priority uplink transmissions and relatively low priority uplink transmissions), the UE may multiplex both the relatively high priority uplink information (e.g., content) and the relatively low priority uplink information (e.g., content) into a single uplink transmission (e.g., or multiple uplink transmissions).

In some examples, the network entity 205 may indicate a selection between the prioritization process and the multiplexing process. For example, the network entity 205 may transmit a semi-static indication (e.g., through RRC signaling) that configures the UE to perform the prioritization process (e.g., intra-UE prioritization) or the multiplexing process (e.g., intra-UE multiplexing). However, the periodicity (e.g., frequency) of semi-static indications may be prohibitive due to an increased processing time for multiplexing transmissions of different priorities. As such, the network entity 205 may dynamically indicate (e.g., via 1 bit in a DCI message), for the UE 215 to perform the prioritization process (e.g., intra-UE prioritization) or the multiplexing process (e.g., intra-UE multiplexing).

In some examples, dynamic indication may enable the network entity 205 to schedule a relatively high priority transmission (e.g., an urgent high priority channel) to be transmitted by the UE 215. For example, the network entity 205 may transmit a DCI message scheduling a relatively high priority transmission for the UE 215 after a deadline to indicate multiplexing (e.g., a processing deadline for multiplexing) has passed. In such an example, the network entity 205 may indicate a prioritization process in the DCI message. That is, the network entity 205 may include an indication for the UE 215 to perform the prioritization process in the DCI message used to schedule the relatively high priority transmission. As such, the relatively high priority transmission may cancel (e.g., may indicate for the UE 215 to cancel) scheduled (e.g., ongoing) relatively low priority uplink transmissions. That is the UE 215 may cancel scheduled transmissions that are of a relatively low priority and may transmit the relatively high priority transmission. Thus, dynamic indication of an overlap resolution process may provide the network scheduling flexibility.

For example, if a relatively high priority (e.g., urgent) transmission satisfies (e.g., meets) the processing deadline (e.g., the deadline for multiplexing overlapping transmissions, a multiplexing deadline), the network may indicate a multiplexing process in the DCI message scheduling the relatively high priority transmission. Additionally, or alternatively, if the relatively high priority transmission fails to satisfy the processing deadline the network entity 205 may indicate a prioritization process in the DCI scheduling the relatively high priority transmission. In some examples, the processing deadline may be communicated between the UE 215 and the network entity 205 via an information element (IE), such as the T_proc2_mux IE.

For example, as illustrated in the example of FIG. 2, the UE 215 may receive an RRC message 225 that may include a first indication 226 of a default overlap resolution process for application by the UE 215 on a plurality of overlapping transmissions. The plurality of overlapping transmission may be collectively scheduled by one or more first DCI messages 230 (e.g., a first DCI message 230-*a*, a first DCI message 230-*b*, and a first DCI message 230-*c*). The one or more first DCI messages 230 may be received by the UE 215 prior to a processing deadline for multiplexing the plurality of overlapping transmissions. The UE 215 may determine, based on the processing deadline having passed, whether any one of the one or more first DCI messages 230 includes a second indication 231 of a transmission-specific overlap resolution process (e.g., the prioritization process or the multiplexing process) for application by the UE 215 on a first two or more overlapping transmissions of the plurality of overlapping transmissions. The UE 215 may perform a determined overlap resolution process 235 that may include either the transmission-specific overlap resolution process indicated by one of the one or more first DCI messages 230 or the default overlap resolution process indicated by the RRC message 225.

For example, the UE 215 may determine that a triggering DCI message (e.g., the first DCI message 230-*c*) of the one or more first DCI messages 230 includes the second indication 231 of the transmission-specific overlap resolution process. In such an example, the determined overlap resolution process 235 may be the transmission-specific overlap resolution process. Additionally, or alternatively, the UE 215 may determine that the one or more first DCI messages 230 fail to include the second indication 231. In such an example, the determined overlap resolution process 235 may be the default overlap resolution process. Therefore, as a result of the framework for indication of an overlap resolution process as described herein, the UE 215 may reduce latency and increase reliability of wireless communications with the network entity 205.

Figure 3:
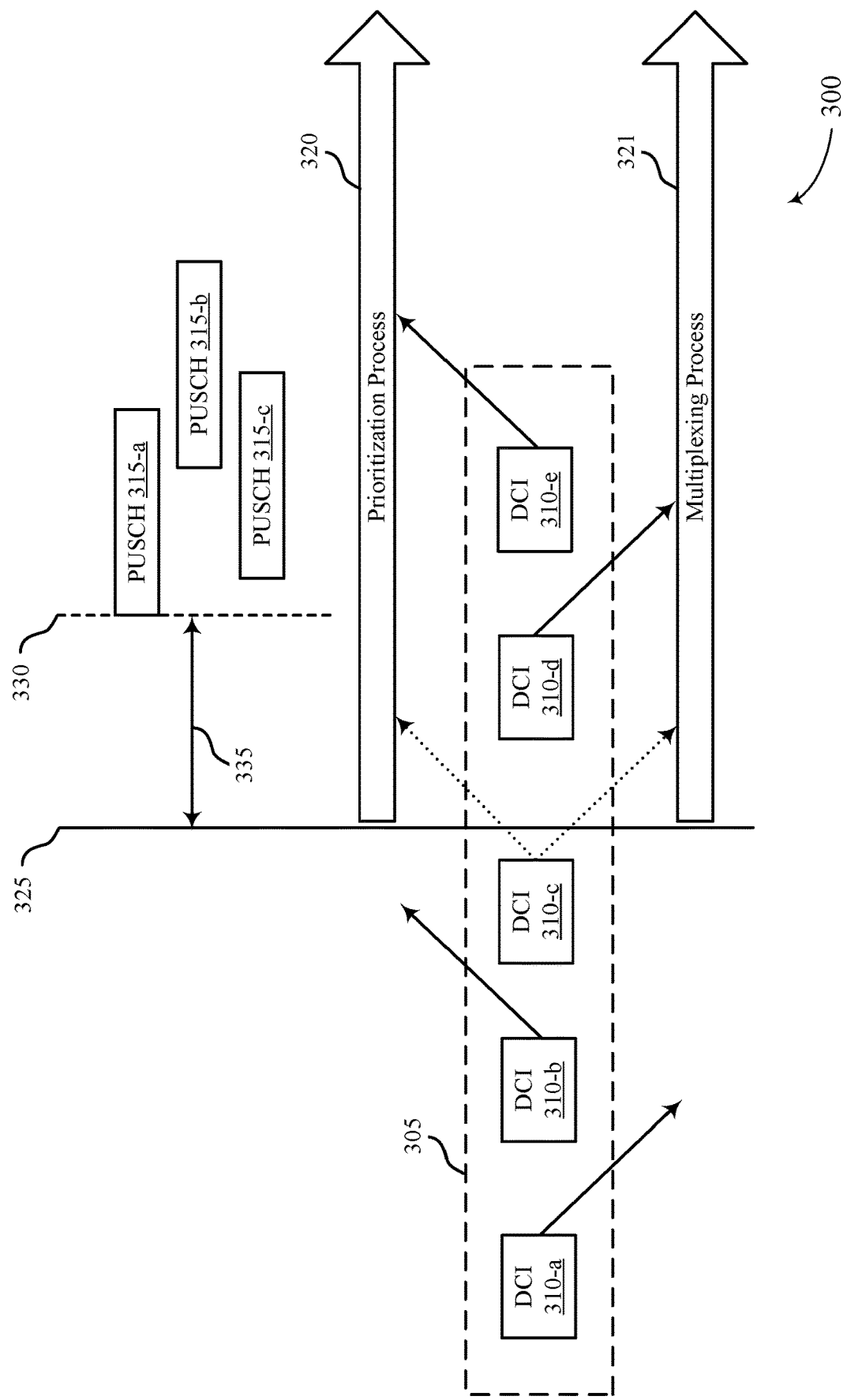
FIG. 3 illustrates an example of a process diagram that supports a framework for indication of an overlap resolution process in accordance with one or more aspects of the present disclosure.

FIG. 3 illustrates an example of a process diagram 300 that supports a framework for indication of an overlap resolution process in accordance with one or more aspects of the present disclosure. The process diagram 300 may implement or be implemented by one or more aspects of the wireless communications system 100 and the wireless communications system 200. For example, the process diagram 300 may be implemented by a network entity 105 or a UE 115, which may be examples of the corresponding devices as described with reference to FIGS. 1 and 2.

In some examples, while a communications device (e.g., the UE 115) may support dynamic indication of an overlap resolution process, the behavior of the UE 115 may be complex and indication included in current (e.g., recently received) DCI message may supersede (e.g., override, take priority over) indications included in previously received DCI messages. For example, in response to receiving a first DCI message that includes an indication for the to perform a first overlap resolution process (e.g., a transmission-specific overlap resolution process), the UE 115 may start (e.g., begin) a first process chain associated with the first overlap resolution process. However, the UE 115 may receive a second DCI message (e.g., subsequent to the first DCI message) indicating for the UE 115 to perform a second (e.g., different) overlap resolution process (e.g., associated with a second process chain). As such, the UE 115 may stop (halt, pause, delay, discard) an ongoing (e.g., the current) process chain and switch to the other (e.g., different) process chain (e.g., indicated by the second DCI message). That is, the UE 115 may stop the first process chain (e.g., corresponding to the first overlap resolution process) indicated by the first DCI message if the UE 115 receives a second DCI message (e.g., subsequent to the first DCI message) indicating a second process chain (e.g., corresponding to a different overlap resolution process). In such an example, the UE 115 may determine to either start (e.g., restart) the second process chain, or resume the first (e.g., previously stopped) process chain, which may result in increased processing and reduced communications for the UE 115. As such, a framework for dynamic indication of an overlap resolution process may be desirable.

For example, as illustrated by the example of FIG. 2, the UE 115 may monitor for DCI message during a monitoring window 305. The UE 115 may receive one or more DCI messages (e.g., a DCI 310-*a*, a DCI 310-*b*, a DCI 310-*c*, a DCI 310-*d*, and a DCI-310-*e*) that may each schedule one or more uplink transmissions (e.g., physical uplink shared channel (PUSCH) transmissions) to be performed by the UE 115. For example, the DCI 310-*a* may schedule a PUSCH 315-*a*, the DCI 310-*b* may schedule a PUSCH 315-*b*, and the DCI 310-*c* may schedule a PUSCH 315-*c*. Each of the one or more DCIs 310 may also include an indication of a transmission-specific overlap resolution process, such as an indication of a prioritization process 320 or a multiplexing process 321. The prioritization process 320 and the multiplexing process 321 may be examples of the corresponding processes as described with reference to FIG. 2.

For example, the UE 115 may receive the DCI 310-*c* that may indicate for the UE 115 to perform an overlap resolution process. The transmission-specific overlap resolution process indicated by the DCI 310-*c* (e.g., to perform the prioritization process 320 or the multiplexing process 321) may override transmission-specific overlap resolution process indicated by the DCI 310-b (e.g., and other previously received DCI messages). That is, the UE 115 may determine to perform the transmission-specific overlap resolution process (e.g., the prioritization process 320 or the multiplexing process 321) indicated by a last (e.g., a temporarily last) received DCI message on the transmissions collectively scheduled by the DCI 310-a, the DCI 310-b, and the DCI 310-c (e.g., on the PUSCH 315-a, the PUSCH 315-b, and the PUSCH 315-c). For example, the PUSCH 315-a, the PUSCH 315-b, and the PUSCH 315-c may be of different priorities and may be scheduled for transmission over overlapping channels.

In some examples, a processing time for multiplexing transmissions of different priorities may be increased relative to a processing time for multiplexing transmissions of a same priority. That is, a processing time (e.g., a duration 335) associated with performing the multiplexing process 321 may be increased relative to a processing time associated with performing the prioritization process 320. As such, the UE 115 may determine to perform either the prioritization process 320 or the multiplexing process 321 based on a processing deadline 325. The processing deadline 325 may be an example of a processing deadline as described with reference to FIG. 2. For example, prior to the processing deadline 325, the UE 115 may monitor for DCI messages (e.g., the DCIs 310) and may not begin (e.g., start, kick off) an overlap resolution process (e.g., the prioritization process 320 or the multiplexing process 321). After the processing deadline has past, the UE 115 may determine to begin the prioritization process 320 (e.g., the UE 115 may begin multiplexing channels of a same priority) or the UE 115 may begin the multiplexing process 321 (e.g., the UE 115 may begin multiplexing channels of different priorities). In some examples, the UE 115 may determine to begin the prioritization process 320 or the multiplexing process 321 based on a DCI received prior to the processing deadline 325 (e.g., the last received DCI, the 310-c). That is, the DCI 310-c may trigger the UE 115 to perform (e.g., begin) the prioritization process 320 or the multiplexing process 321). In some examples, the network may refrain from transmitting (e.g., issuing) DCI after the processing deadline 325 that include an indication that conflicts with the overlap resolution process determined to be performed by the UE 115.

In some examples, the UE 115 may receive the DCI 310-d and the DCI 310-e after the processing deadline 325 that may schedule additional transmissions for the UE 115. The DCI 310-d and the DCI 310-e may also indicate for the UE 115 to perform a transmission-specific overlap resolution process (e.g., the multiplexing process 321 and the prioritization process 320, respectively) on the additional transmissions. However, the transmission-specific overlap resolution process indicated by the DCI 310-c may be the multiplexing process 321 and, as such, the UE 115 may have started the multiplexing process 321 prior to receiving the DCI 310-d and the DCI 310-e. For example, to perform the multiplexing process 321 for the PUSCH 315-a, the PUSCH 315-b, and the PUSCH 315-c, the UE 115 may begin the multiplexing process 321 prior to a start time 330 of one or more scheduled transmissions (e.g., an earliest scheduled transmission, the PUSCH 315-a). That is, to accommodate the processing time (e.g., the duration 335) associated with the multiplexing process 321, the UE 115 may start (e.g., restart, begin, resume) the multiplexing process 321 after the processing deadline 325. The time difference between the processing deadline 325 and the start time 330 may be equal to the duration 335. As such, if the UE 115 receives additional DCI messages after the processing deadline 325 (e.g., the DCI 310-d and the DCI 310-e), the UE 115 may have started the multiplexing process 321 (e.g., for the PUSCH 315-a, the PUSCH 315-b, and the PUSCH 315-c) and may not be capable of performing the multiplexing process 321 (e.g., or an overlap resolution process) for transmissions scheduled by the additional DCI messages. For example, the UE 115 may determine to refrain from transmitting (e.g., drop, cancel) transmission scheduled by the DCI 310-d and the DCI 310-e. Additionally, or alternatively, the UE 115 may determine to refrain from monitoring for additional DCI messages. In some examples, the UE 115 may determine to refrain from monitoring for additional DCI messages to avoid overlapping transmissions (e.g., scheduled via the additional DCI messages) from resulting in one or more errors at the UE 115. That is, the UE 115 may refrain from monitoring for additional DCI messages to avoid (e.g., prevent) the network (e.g., the network entity 105) from transmitting additional DCI message (e.g., DCIs 310) that may cause one or more errors at the UE 115. In some examples, however, if a DCI message indicating the multiplexing process 321 does not meet a decision deadline (e.g., the processing deadline 325), the UE 115 may stop (e.g., halt) a current overlap resolution process (e.g., hardware or software of a process chain associated with the current overlap resolution process) and the network may (e.g., subsequently) issue an additional DCI message indicating for the UE to perform the prioritization process.

Additionally or alternatively, the transmission-specific overlap resolution process indicated by the DCI 310-c may be the prioritization process 320. In such examples, if the UE 115 receives additional DCI after the processing deadline 325 (e.g., the DCI 310-d and the DCI 310-e) the UE 115 may determine whether to perform the prioritization process 320 on transmission scheduled by the additional DCI based on the transmission-specific overlap resolution process indicated by the additional DCI messages. For example, the DCI 310-d may indicate for the UE 115 to perform the multiplexing process 321. As such, the UE 115 may determine to drop transmissions scheduled by the DCI 310-d. However, in other examples, the DCI 310-e may indicate for the UE 115 to perform the prioritization process 320. In such examples, due to the reduced processing time associated with the prioritization process 320 (e.g., compared to the multiplexing process 321), the UE 115 may determine to perform the prioritization process 320 for transmissions schedule by the DCI 310-e.

Figure 4:
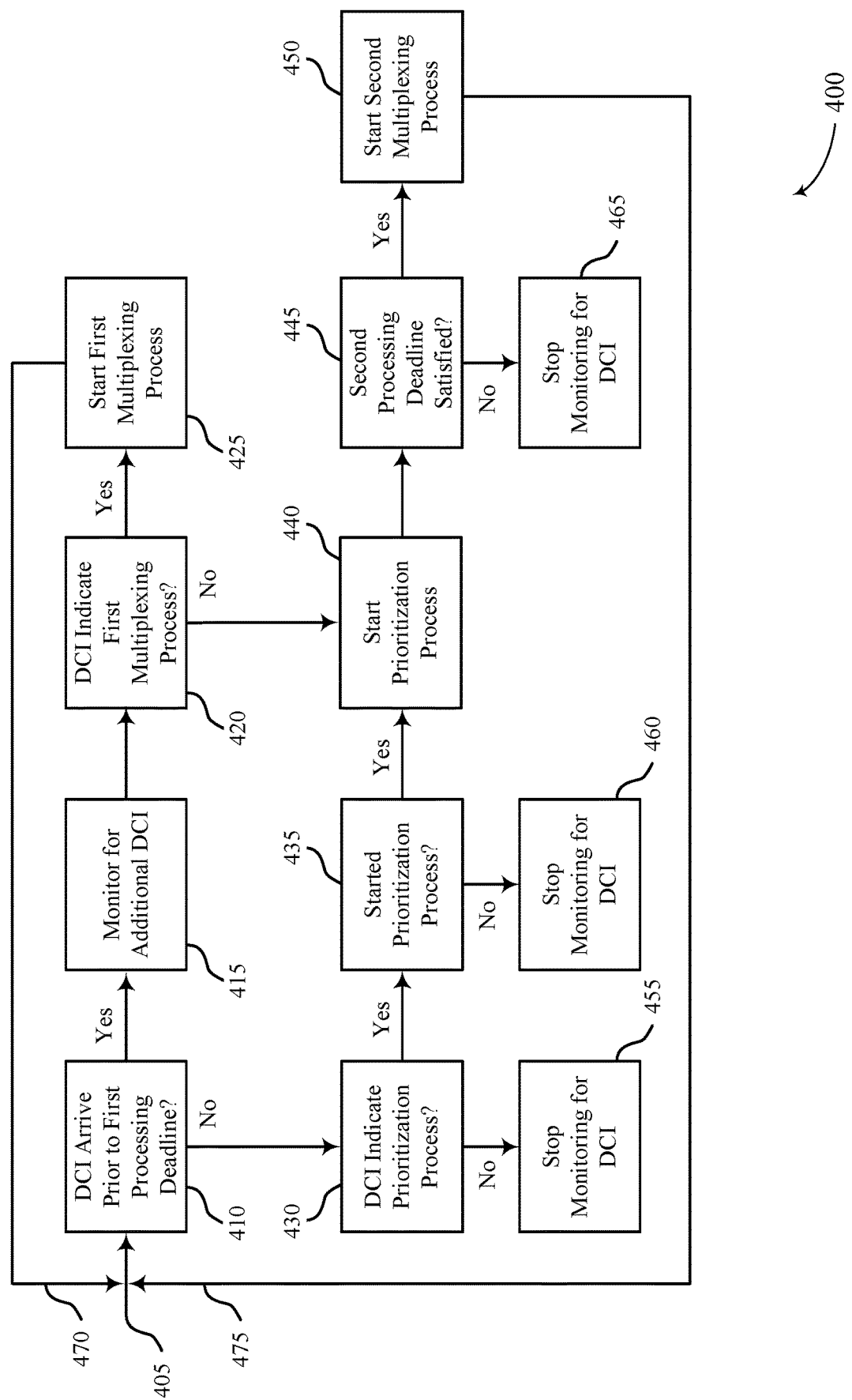
FIG. 4 illustrates an example of a procedure that supports a framework for indication of an overlap resolution process in accordance with one or more aspects of the present disclosure.

FIG. 4 illustrates an example of a procedure 400 that supports a framework for indication of an overlap resolution process in accordance with one or more aspects of the present disclosure. The procedure 400 may implement or be implemented by one or more aspects of the wireless communications system 100 and the wireless communications system 200. For example, the procedure 400 may be implemented by a network entity 105 or a UE 115, which may be examples of the corresponding devices as described with reference to FIGS. 1 and 2. In the example of FIG. 4, the UE 115 may employ the procedure 400 as a timeline (e.g., a deadline) for determining whether to perform an overlap resolution process that includes a first multiplexing process or a prioritization process. The first multiplexing process and the prioritization process may be examples of the corresponding processes as described with reference to FIGS. 2 and 3. For example, the first multiplexing process may be an overlap resolution process in which the UE 115 uses a first multiplexing process to multiplex transmissions regardless of priority and the prioritization process may be an overlap resolution process in which the UE 115 prioritizes transmissions based on priority and uses a second multiplexing process to multiplex transmissions of a same priority.

As illustrated in the example of FIG. 4, a network (e.g., one or more network entities) may configure a communication device (e.g., the UE 115) to perform an overlap resolution process to resolve conflicts between overlapping channels. The network may configure the UE 115 with the overlap resolution process via semi-static signaling or dynamic signaling. For example, the network may transmit semi-static signaling (e.g., an RRC message) configuring the UE 115 with a default overlap resolution process. Additionally, or alternatively, the UE 115 may monitor for DCI messages that may schedule transmissions (e.g., uplink transmissions) for the UE 115. In some examples, the DCI messages may include an indication of a transmission-specific overlap resolution process to be performed by the UE 115 for the scheduled transmissions. In some examples, if the UE 115 fails to receive a DCI message or if a received DCI message fails to include an indication of a transmission-specific overlap resolution process (e.g., and a processing deadline has passed), the UE 115 may determine to perform the default overlap resolution process indicated by the network via the RRC message.

At 405, the UE 115 may receive a DCI message scheduling one or multiple transmissions to be performed by the UE 115. The DCI message may include an indication of a transmission-specific overlap resolution process. At 410, the UE 115 may determine whether the DCI message was received by the UE 115 (e.g., arrived) prior to a first processing deadline. The first processing deadline may be an example of a processing deadline as described with reference to FIGS. 2 and 3. For example, the first processing deadline may be associated with a processing time for multiplexing transmissions of different priorities.

At 415, if the DCI message was received by the UE 115 prior to the first processing deadline, the UE 115 may monitor for additional DCI messages. At 420, the UE 115 may determine whether the transmission-specific overlap resolution process indicated by the DCI message is the first multiplexing process.

At 425, if the transmission-specific overlap resolution process indicated by the DCI message is the first multiplexing process, the UE 115 may start (e.g., begin) the first multiplexing process for transmissions scheduled by the DCI message (e.g., and other DCI messages received prior to the first processing deadline). In some examples, the first multiplexing process may include multiplexing channels (e.g., transmission) of a same priority and multiplexing channels (e.g., transmissions) across different priorities. At 440, if the transmission-specific overlap resolution process indicated by the DCI message is not the first multiplexing process (e.g., is the prioritization process), the UE 115 may start (e.g., begin) the prioritization process for transmissions scheduled by the DCI message (e.g., and other DCI messages received prior to the first processing deadline). Additionally, or alternatively, if the transmissions scheduled by the DCI message (e.g., and previously received DCI messages) are of a same priority, the UE 115 may determine to perform the prioritization process.

At 430, if the DCI message was not received by the UE 115 prior to the first processing deadline, the UE 115 may determine whether the transmission-specific overlap resolution process indicated by the DCI message is the prioritization process. At 455, if the transmission-specific overlap resolution process is not the prioritization process (e.g., if the DCI message indicated for the UE 115 to perform the first multiplexing process), the UE 115 may stop monitoring for additional DCI message. Additionally, or alternatively, the UE 115 may refrain from transmitting (e.g., drop, cancel) transmissions scheduled by the DCI message.

At 435, if the transmission-specific overlap resolution process indicated by the DCI message is the prioritization process, the UE 115 may determine whether the UE 115 has started (e.g., has previously received an indication to perform) a prioritization process. For example, another DCI message received prior to the first processing deadline may have indicated for the UE to perform a transmission-specific overlap resolution process that the UE 115 may have started after the first processing deadline passed (e.g., prior to receiving the DCI message). Additionally, or alternatively, the UE 115 may have started a default overlap resolution process indicated by an RRC message. At 440, if the UE 115 has started a prioritization process, the UE 115 may start (e.g., restart, continue, resume) the prioritization process for transmissions scheduled by the DCI message (e.g., and other DCI messages received prior to the first processing deadline). At 460, if the UE 115 has not started the prioritization process (e.g., if the UE 115 has started the first multiplexing process), the UE 115 may stop monitoring for additional DCI messages. Additionally, or alternatively, the UE 115 may drop transmissions scheduled by the DCI message.

In some examples, as part of starting the prioritization process at 440, the UE 115 may drop relatively low priority transmissions that overlap with relatively high priority transmissions. At 445, the UE 115 may determine whether remaining transmissions (e.g., the relatively high priority transmissions or relatively low priority transmissions that do not overlap with relatively high priority transmissions) satisfy a second processing deadline (e.g., timeline) for multiplexing transmissions of a same priority. At 450, if the remaining transmissions satisfy the second processing deadline, the UE 115 may start the second multiplexing process for transmissions of a same priority. For example, the UE 115 may multiplex the remaining transmissions of the same priority. At 465, if the remaining transmissions fail to satisfy the second processing deadline, the UE 115 may stop monitoring for additional DCI messages. Additionally, or alternatively, the UE 115 may drop transmissions scheduled by the DCI message (e.g., and other DCI messages). In some examples, after starting the first multiplexing process at 425 or starting the second multiplexing process at 450, the UE 115 may monitor for additional DCI message. For example, at 470 and at 475, the UE 115 may monitor for additional DCI message.

Figure 5A:
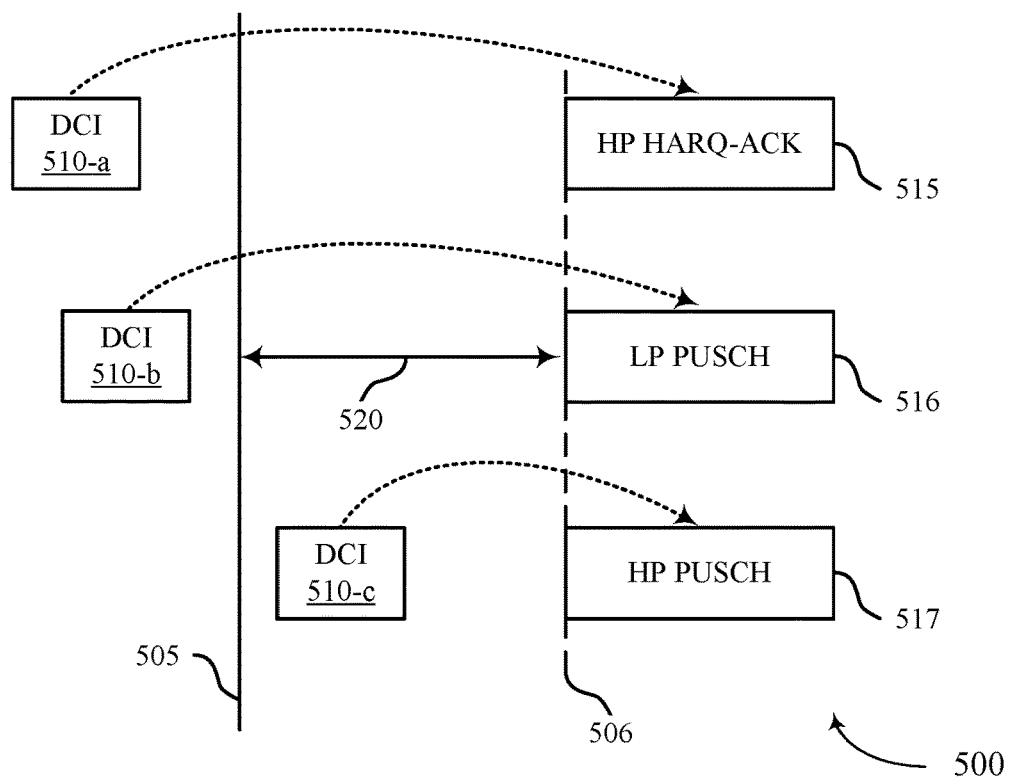
FIG. 5A illustrates an example of a process diagram that supports a framework for indication of an overlap resolution process in accordance with one or more aspects of the present disclosure.

FIG. 5A illustrates an example of a process diagram 500 that supports a framework for indication of an overlap resolution process in accordance with one or more aspects of the present disclosure. The process diagram 500 may implement or be implemented by one or more aspects of the wireless communications system 100 and the wireless communications system 200. For example, the process diagram 500 may be implemented by a network entity 105 or a UE 115, which may be examples of the corresponding devices as described with reference to FIGS. 1 and 2.

As illustrated in the example of FIG. 5A, a wireless communications network (e.g., one or more network entities 105) may configure a communication device (e.g., the UE 115) to perform an overlap resolution process to resolve conflicts between overlapping channels. For example, the UE 115 may monitor for DCI messages that may schedule transmissions (e.g., uplink transmissions) for the UE 115 and include an indication of a transmission-specific overlap resolution process to be performed by the UE 115 for the scheduled transmissions. The transmission-specific overlap resolution process may be an example of a transmission-specific overlap resolution process as described with reference to FIGS. 2 through 4. For example, the transmission-specific overlap resolution process may include a multiplexing process or a prioritization process. The multiplexing process and the prioritization process may be examples of the corresponding processes as described with reference to FIGS. 2 through 4. For example, the multiplexing process may be an example of an overlap resolution process in which the UE 115 may multiplex transmissions regardless of priority and the prioritization process may be an example of an overlap resolution process in which the UE 115 multiplexes transmissions based on priority. In some examples, the UE 115 may receive multiple DCI messages that each include indications of a transmission-specific overlap resolution process. In such examples, a last received (e.g., a temporarily last, current) DCI message may override indications of previously received DCI messages. As such, a framework for dynamic indication of an overlap resolution process may be desirable.

In some examples, the UE 115 may be configured with (e.g., may employ) a processing deadline 505 for determining whether to perform an overlap resolution process that includes the multiplexing process or the prioritization process. The processing deadline 505 may be an example of a processing deadline as described with reference to FIGS. 2 through 4. For examples, the processing deadline 505 may occur prior to a start time 506 of one or more scheduled transmissions (e.g., an earliest scheduled transmission). That is, to accommodate the processing time for multiplexing transmissions of different priorities (e.g., a duration 520), the UE 115 may start (e.g., restart, begin, resume) the multiplexing process after the processing deadline 505. As such, the UE 115 may use the processing deadline 505 as a decision deadline for determining whether to perform the multiplexing process or the prioritization process.

In some examples, prior to the processing deadline 505, the UE 115 may monitor for one or more DCI messages (e.g., a DCI 510-a and a DCI 510-b). After the processing deadline (e.g., the decision deadline) the UE 115 may begin (e.g., kick off, starting) an overlap resolution process (e.g., the multiplexing process or the prioritization process) based on the last DCI message received prior to the processing deadline (e.g., the DCI 510-b, a triggering DCI message). In some examples, after the processing deadline and as a result of the UE 115 starting the overlap resolution process, the UE 115 may not receive another DCI message that indicates for the UE 115 to perform the multiplexing process (e.g., that indicates an overlap resolution procedure inconsistent with the overlap resolution procedure indicated by the last received DCI message prior to the processing deadline). Additionally, or alternatively, the UE 115 may receive another DCI message that indicates for the UE 115 to perform the multiplexing process, however the UE 115 may determine to refrain from performing the multiplexing process.

For example, prior to the processing deadline 505 the UE 115 may receive the DCI 510-a that may schedule one or more resources for the UE 115 to transmit a relatively high priority hybrid automatic repeat request (HARD) acknowledgment (e.g., an HP HARQ-ACK 515). The UE 115 may also receive the DCI 510-b that may schedule one or more resources for the UE 115 to transmit a relatively low priority uplink transmission (e.g., an LP PUSCH 516). The DCI 510-b may include an indication of a transmission-specific overlap resolution process (e.g., the prioritization process or the multiplexing process) to be performed by the UE 115 for the LP PUSCH 516). After the processing deadline 505 has passed, the UE 115 may receive the DCI 510-c that may schedule one or more additional resources for the UE 115 to transmit a relatively high priority uplink transmission (e.g., an HP PUSCH 517). The DCI 510-c may also include an indication of a transmission-specific overlap resolution process to be performed by the UE 115 on the HP PUSCH 517. For example, the DCI 510—may indicate for the UE 115 to perform the multiplexing process. However, in some examples, the transmission-specific overlap resolution process indicated by the DCI 510-b may also be the multiplexing process. As such, after the processing deadline 505 has passed, the UE 115 may have started (e.g., kicked-off) the multiplexing process for the HP HARQ-ACK 515 and the LP PUSCH 516. Therefore, the UE 115 may not be capable (e.g., due to an increase processing time associated with multiplexing transmission of different priorities) of multiplexing the HP PUSCH 517 (e.g., the currently scheduled channel) with the HP HARQ-ACK 515 and the LP PUSCH 516 (e.g., the previously multiplexed channels).

In other examples, the transmission-specific overlap resolution process indicated by the DCI 510-b may be the prioritization process. As such, after the processing deadline 505 has passed, the UE 115 may start (e.g., kick-off) the prioritization process for the HP HARQ-ACK 515 and the LP PUSCH 516. In some examples, as part of the prioritization process, the UE 115 may determine to refrain from transmitting (e.g., drop, cancel) the relatively low priority transmissions based on one or more capabilities of the UE 115. For example, the UE 115 may drop the relatively low priority channel after receiving a DCI message that schedules a relatively high priority transmission and before a start time of the scheduled relatively high priority transmissions. Additionally, or alternatively, the UE may refrain from dropping relatively low priority transmissions prior to the processing deadline 505 (e.g., the decision deadline). For example, after the processing deadline 505 has passed, the UE 115 may determine to cancel relatively low priority channels (e.g., the LP PUSCH 516). That is, after the processing deadline 505 passed, the UE 115 may have dropped transport blocks associated with relatively low priority transmission (e.g., the LP PUSCH 516). Therefore, the UE 115 may not be capable of multiplexing the dropped relatively low priority channels with relatively high priority channels (e.g., the UE may not be capable of performing the multiplexing process indicated by the DCI 510-c).

As a result, if a DCI message received after the processing deadline 505 indicates for the UE 115 to perform the multiplexing process, the UE 115 may not be capable of performing the multiplexing process for transmissions scheduled by the DCI message. As such, the UE 115 may determine to drop the transmission scheduled by the DCI message and refrain from monitoring for additional DCI messages.

Figure 5B:
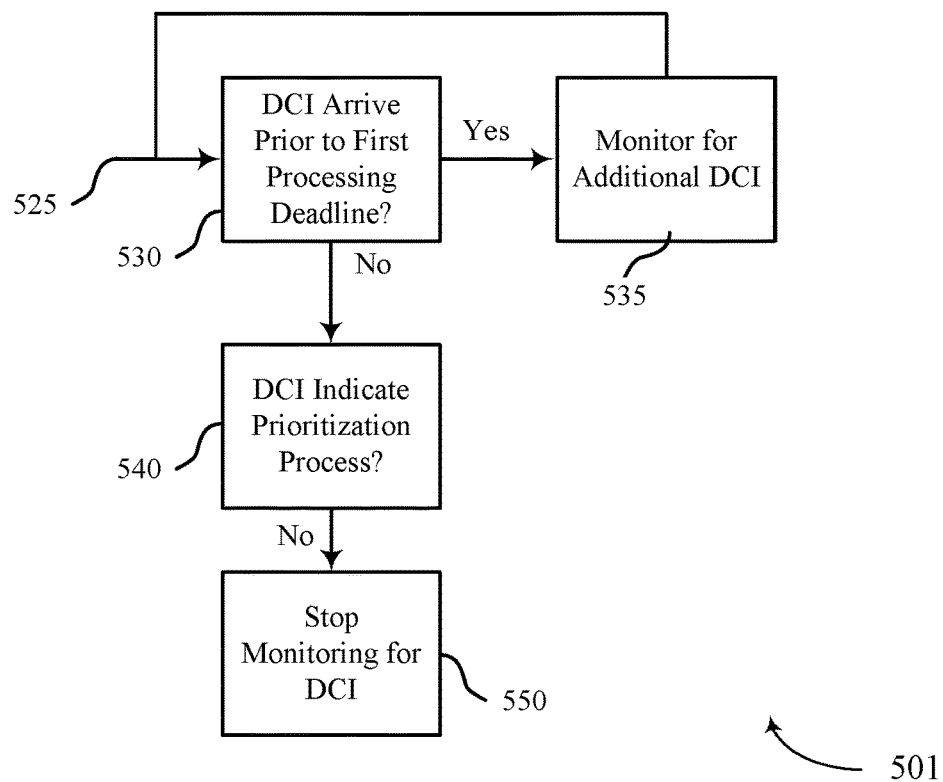
FIG. 5B illustrates an example of a procedure that supports a framework for indication of an overlap resolution process in accordance with one or more aspects of the present disclosure.

FIG. 5B illustrates an example of a procedure 501 that supports a framework for indication of an overlap resolution process in accordance with one or more aspects of the present disclosure. The procedure 501 may implement or be implemented by one or more aspects of the wireless communications system 100 and the wireless communications system 200. For example, the procedure 501 may be implemented by a network entity 105 or a UE 115, which may be examples of the corresponding devices as described with reference to FIGS. 1 and 2.

In some examples, if a DCI message received after a processing deadline for multiplexing transmissions of different priorities indicates for the UE 115 to perform a multiplexing process, the UE 115 may not be capable of performing the multiplexing process for one or multiple transmissions scheduled by the DCI message. Therefore, as illustrated in the example of FIG. 5B, the UE may determine to refrain from transmitting (e.g., drop, cancel) the one or more transmissions scheduled by the DCI message (e.g., received after the processing deadline) and refrain from monitoring for additional DCI messages.

For example, at 525, the UE 115 may receive a DCI message scheduling one or multiple transmissions to be performed by the UE 115. The DCI message may include an indication of a transmission-specific overlap resolution process. The transmission-specific overlap resolution process may be an example of a transmission-specific overlap resolution process as described with reference to FIGS. 2 through 4. For example, the transmission-specific overlap resolution process may include a multiplexing process or a prioritization process. The multiplexing process and the prioritization process may be examples of the corresponding processes as described with reference to FIGS. 2 through 4. For example, the multiplexing process may be an overlap resolution process in which the UE 115 may multiplex transmissions regardless of priority and the prioritization process may be an overlap resolution process in which the UE 115 multiplexes transmissions based on priority. At 530, the UE 115 may determine whether the DCI message was received by the UE 115 prior to the processing deadline for multiplexing transmissions of different priorities. The processing deadline may be an example of a processing deadline as described with reference to FIGS. 2 through 4. At 535, if the DCI message was received by the UE 115 prior to the processing deadline, the UE 115 may monitor for additional DCI messages (e.g., up to the processing deadline).

At 540, if the DCI message was not received by the UE 115 prior to the first processing deadline, the UE 115 may determine whether the transmission-specific overlap resolution process indicated by the DCI message is the prioritization process. At 550, if the DCI message did not indicate a prioritization process (e.g., if the DCI message indicated the first multiplexing process), the UE 115 may stop (e.g., refrain from) monitoring for additional DCI message. Additionally, or alternatively, the UE 115 may drop the one or multiple transmissions scheduled by the DCI message.

Figure 6A:
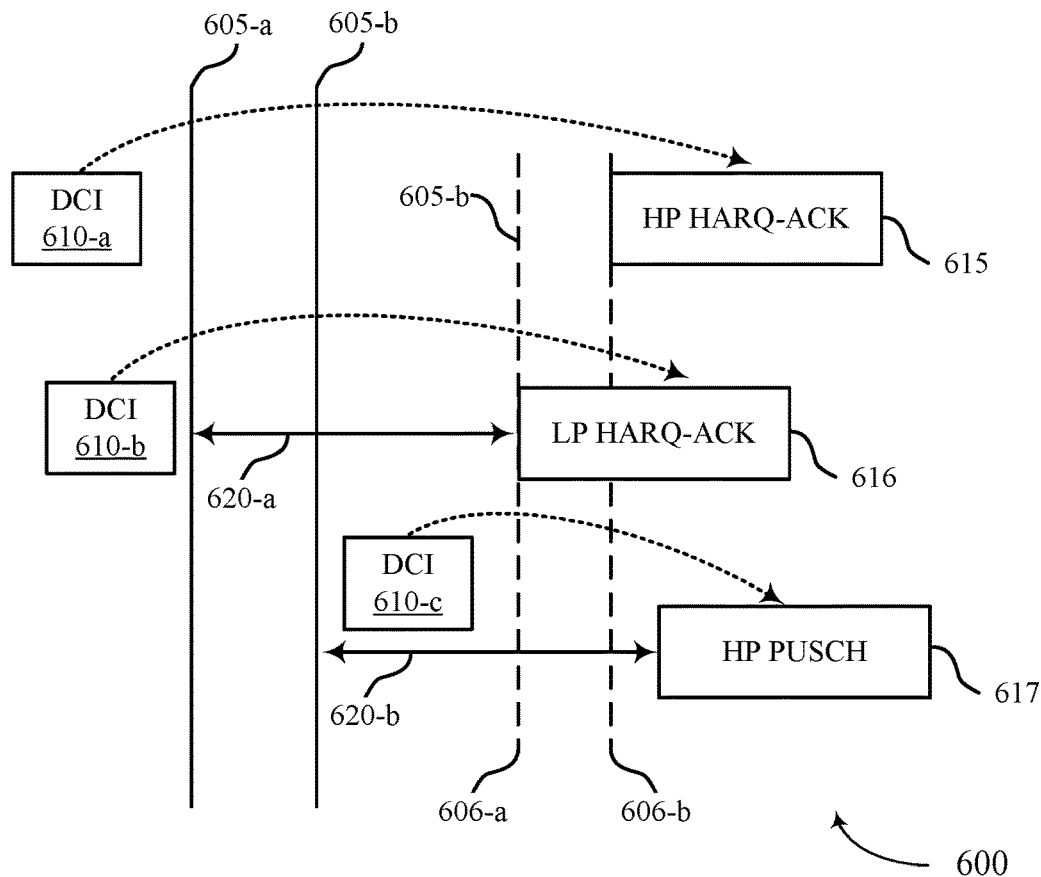
FIG. 6A illustrates an example of a process diagram that supports a framework for indication of an overlap resolution process in accordance with one or more aspects of the present disclosure.

FIG. 6A illustrates an example of a process diagram 600 that supports a framework for indication of an overlap resolution process in accordance with one or more aspects of the present disclosure. The process diagram 600 may implement or be implemented by one or more aspects of the wireless communications system 100 and the wireless communications system 200. For example, the process diagram 600 may be implemented by a network entity 105 or a UE 115, which may be examples of the corresponding devices as described with reference to FIGS. 1 and 2.

As illustrated in the example of FIG. 6A, a network (e.g., one or more network entities) may configure a communications device (e.g., the UE 115) to perform an overlap resolution process to resolve conflicts between overlapping channels. For example, the UE 115 may receive a DCI messages that includes an indication of a transmission-specific overlap resolution process. In some examples, the transmission-specific overlap resolution process may be a prioritization process. The prioritization process may be an example of a prioritization process as described with reference to FIGS. 2 through 4, 5A, and 5B. For example, the prioritization process may be an example of an overlap resolution process in which the UE 115 multiplexes transmissions based on priority.

For example, the UE 115 may monitor for DCI messages that may schedule transmissions (e.g., uplink transmissions) for the UE 115 and include an indication of a transmission-specific overlap resolution process to be performed by the UE 115 for the scheduled transmissions. Additionally or alternatively the UE 115 may be configured with (e.g., may employ) a first processing deadline 605-*a* for determining whether to perform an overlap resolution process that includes a multiplexing process or the prioritization process. The multiplexing process may be an example of a multiplexing processes as described with reference to FIGS. 2 through 4. For example, the multiplexing process may be an example of an overlap resolution process in which the UE 115 may multiplex transmissions regardless of priority. Additionally, or alternatively, the first processing deadline 605-*a* may be an example of a processing deadline as described with reference to FIGS. 2 through 4. For examples, the first processing deadline 605-*a* may occur prior to a start time 606-*a* of one or more scheduled transmissions (e.g., an earliest scheduled transmission). That is, to accommodate a processing time for multiplexing transmissions of different priorities (e.g., a duration 620-*a*), the UE 115 may use the first processing deadline 605-*a* for determining whether to perform the multiplexing process or the prioritization process.

In some examples, prior to the first processing deadline 605-*a*, the UE 115 may receive one or more DCI messages (e.g., a DCI 610-*a* and a DCI 610-*b*). The DCI 610-*a* may schedule one or more resources for the UE 115 to transmit a relatively high priority transmission (e.g., an HP HARQ-ACK 615). The UE 115 may also receive the DCI 510-*b* that may schedule one or more resources for the UE 115 to transmit a relatively low priority transmission (e.g., an LP PUSCH 616). In some examples, the DCI 510-*b* (e.g., a last received DCI message prior to the first processing deadline 605-*a*, a triggering DCI message) may also include an indication for the UE 115 to perform the prioritization process. As such, after the first processing deadline 605-*a* has passed, the UE 115 may start (e.g., kick-off) the prioritization process for the HP HARQ-ACK 615 and the LP PUSCH 616. For example, after the first processing deadline 605-*a* has passed, the UE 115 may determine to cancel the LP PUSCH 616.

Additionally, or alternatively, the UE 115 may receive an additional DCI message (e.g., a DCI 610-*c*) after the first processing deadline 605-*a*. The DCI 610-*c* may schedule one or more resources for the UE 115 to transmit a relatively high priority transmission (e.g., an HP PUSCH 617) and may also indicate for the UE 115 to perform the prioritization process. As such, the UE 115 may determine whether the HP HARQ-ACK 615 and the HP PUSCH 617 satisfy a second processing deadline 605-*b* for multiplexing transmissions of a same priority. The second processing deadline 605-*b* may be an example of a second processing deadline as described with reference to FIG. 4. For example, the second processing deadline 605-*b* may occur prior to a start time 606-*b* of one or more scheduled transmissions (e.g., an earliest scheduled transmission of a same priority). That is, to perform multiplexing for the HP PUSCH 617, the UE 115 may demultiplex the two (e.g., previously) multiplexed channels. In some examples, demultiplexing of the multiplexed channels may include decoupling the two channels (e.g., that are multiplexed), dropping one of the two channels, and multiplexing the other channel (e.g., additional channel scheduled after the first processing deadline) with the previously multiplex channels. As such, to accommodate a second processing time for multiplexing transmissions of the same priority (e.g., a duration 620-*b*), the UE 115 may use the second processing deadline 605-*b* for determining whether to multiplex the HP PUSCH 617 with the HP HARQ-ACK 615. That is, to avoid increased processing due to demultiplexing previously multiplexed channels, the UE 115 may evaluate a timeline (e.g., the second processing deadline 605-*b*) in a condition check based on the remaining transmissions (e.g., the two relatively high priority channels), for example that exclude relatively low priority channels. Therefore, if the DCI 610-*c* is received after the second processing deadline 605-*b*, the UE 115 may determine to refrain from transmitting (e.g., drop, cancel) the HP PUSCH 617 and refrain from monitoring for additional DCI message.

Figure 6B:
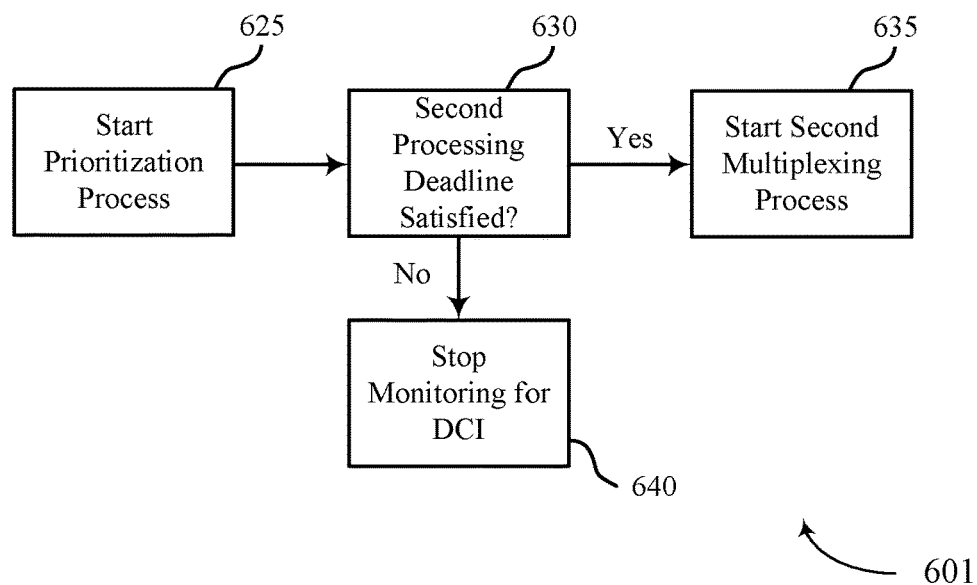
FIG. 6B illustrates an example of a procedure that supports a framework for indication of an overlap resolution process in accordance with one or more aspects of the present disclosure.

FIG. 6B illustrates an example of a procedure 601 that supports a framework for indication of an overlap resolution process in accordance with one or more aspects of the present disclosure. The procedure 601 may implement or be implemented by one or more aspects of the wireless communications system 100 and the wireless communications system 200. For example, the procedure 601 may be implemented by a network entity 105 or a UE 115, which may be examples of the corresponding devices as described with reference to FIGS. 1 and 2.

In some examples, if a DCI message received after a second processing deadline for multiplexing transmissions of a same priority, the UE 115 may not be capable of multiplexing the transmission scheduled by the DCI message. Therefore, as illustrated in the example of FIG. 6B, the UE may determine to refrain from transmitting (e.g., drop, cancel) the transmission scheduled by the DCI message (e.g., received after the second processing deadline) and refrain from monitoring for additional DCI messages. The second processing deadline may be an example of a second processing deadline as described with reference to FIG. 6A. For example, the second processing deadline may occur prior to a start time of one or more scheduled transmissions (e.g., an earliest scheduled transmission of a same priority).

For example, at 625, the UE 115 may start a prioritization process. At 630, as part of the prioritization process, the UE 115 may determine whether remaining transmissions satisfy the second processing deadline for multiplexing transmissions of a same priority. At 635, if the remaining transmissions satisfy the second processing deadline, the UE 115 may start a second multiplexing process for transmissions of a same priority. The second multiplexing process may be an example of a second multiplexing process as described with reference to FIG. 4. For example, the UE 115 may perform the second multiplexing process to multiplex the remaining transmissions of the same priority. At 640, if the remaining transmissions fail to satisfy the second processing deadline, the UE 115 may stop monitoring for additional DCI messages. Additionally, or alternatively, the UE 115 may drop transmissions scheduled by the DCI message (e.g., and other DCI messages).

Figure 7A:
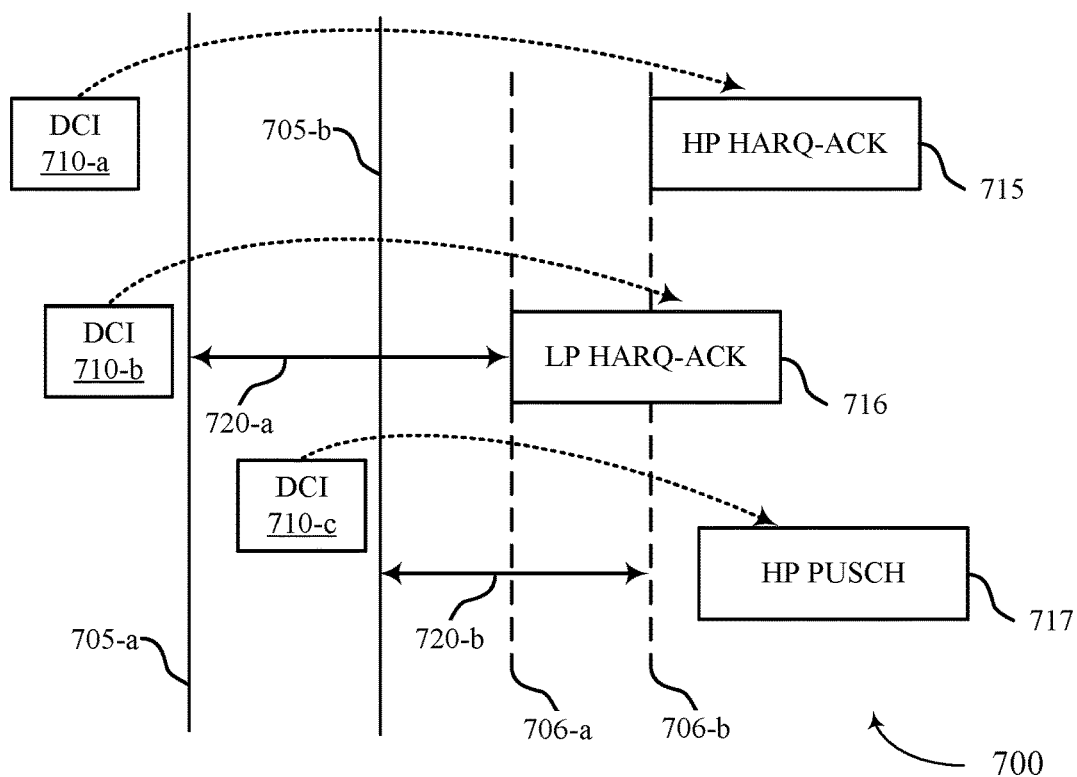
FIG. 7A illustrates an example of a process diagram that supports a framework for indication of an overlap resolution process in accordance with one or more aspects of the present disclosure.

FIG. 7A illustrates an example of a process diagram 700 that supports a framework for indication of an overlap resolution process in accordance with one or more aspects of the present disclosure. The process diagram 700 may implement or be implemented by one or more aspects of the wireless communications system 100 and the wireless communications system 200. For example, the process diagram 700 may be implemented by a network entity 105 or a UE 115, which may be examples of the corresponding devices as described with reference to FIGS. 1 and 2.

As illustrated in the example of FIG. 7A, a network (e.g., one or more network entities) may configure a communication device (e.g., the UE 115) to perform an overlap resolution process to resolve conflicts between overlapping channels. In some examples, the UE 115 may be configured with (e.g., may employ) a first processing deadline 705-*a* for determining whether to perform an overlap resolution process that includes a multiplexing process or a prioritization process. Additionally, or alternatively, the UE 115 may be configured with a second processing deadline 705-*b* for determining whether a UE 115 may multiplex transmissions of a same priority. The multiplexing process and the prioritization process may be examples of the corresponding processes as described with reference to FIGS. 2 through 4. Additionally, or alternatively, the first processing deadline 705-*a* and the second processing deadline 705-*b* may be an example of the corresponding processing deadlines described with reference to FIG. 4. For examples, the first processing deadline 705-*a* may occur prior to a start time 706-*a* of one or more scheduled transmissions (e.g., an earliest scheduled transmission). That is, to accommodate the processing time for multiplexing transmissions of different priorities (e.g., a duration 720-*a*), the UE 115 may start the multiplexing process after the first processing deadline 705-*a*. Therefore, the UE 115 may use the first processing deadline 705-*a* for determining whether to perform the multiplexing process or the prioritization process. Additionally, or alternatively, the second processing deadline 705-*b* may occur prior to a start time 706-*b* of one or more scheduled transmissions (e.g., an earliest scheduled transmission of a same priority). For example, the second processing deadline 705-*b* may occur such that the UE 115 may accommodate a second processing time for multiplexing transmissions of the same priority (e.g., a duration 720-*b*).

In some examples, prior to the first processing deadline 705-*a*, the UE 115 may receive one or more DCI messages (e.g., a DCI 710-*a* and a DCI 710-*b*). The DCI 710-*a* may schedule one or more resources for the UE 115 to transmit a relatively high priority transmission (e.g., an HP HARQ-ACK 715) and the DCI 710-*b* that may schedule one or more resources for the UE 115 to transmit a relatively low priority transmission (e.g., an LP PUSCH 716). Additionally, or alternatively, the UE 115 may receive an additional DCI message (e.g., a DCI 710-*c*) after the first processing deadline 705-*a*. The DCI 710-*c* may schedule one or more resources for the UE 115 to transmit an HP PUSCH 717. The DCI 710-*c* may also include an indication for the UE 115 to perform the prioritization process. However, in some examples, the DCI 710-*b* (e.g., the last received DCI prior to the first processing deadline 705-*a*, the triggering DCI message) may include an indication for the UE 115 to perform the multiplexing process. As such, the UE 115 may not be capable of performing the prioritization process for the transmission scheduled by the DCI 710-*c* (e.g., the HP PUSCH 717).

For example, while the UE 115 may receive the DCI 710-*c* prior to a second processing deadline 705-*b* for multiplexing transmissions of a same priority, the UE 115 may have started the multiplexing process after the first processing deadline 705-*a* passed. That is, after the first processing deadline 705-*a* has passed, the UE 115 may start (e.g., kick-off) the multiplexing process for the HP HARQ-ACK 715 and the LP PUSCH 716. Therefore, the UE 115 may not be capable of performing the prioritization process for the HP PUSCH 717. For example, to perform the prioritization process on the HP PUSCH 717, the UE 115 may demultiplex the two (e.g., previously) multiplexed channels. In some examples, demultiplexing of the multiplexed channels may include decoupling the two channels (e.g., that are multiplexed), dropping one of the two channels, and multiplexing the other channel (e.g., additional channel scheduled after the first processing deadline) with the previously multiplex channels.

Therefore, if a DCI message received after the first processing deadline 705-*a* indicates for the UE 115 to perform the prioritization process and the UE 115 started the multiplexing process, the UE 115 may refrain from performing the prioritization process for transmissions scheduled by the DCI message. That is, to avoid increased processing due to demultiplexing previously multiplexed channels, the UE 115 may determine to refrain from transmitting (e.g., drop, cancel) the transmission scheduled by the DCI message and refrain from monitoring for additional DCI messages.

Figure 7B:
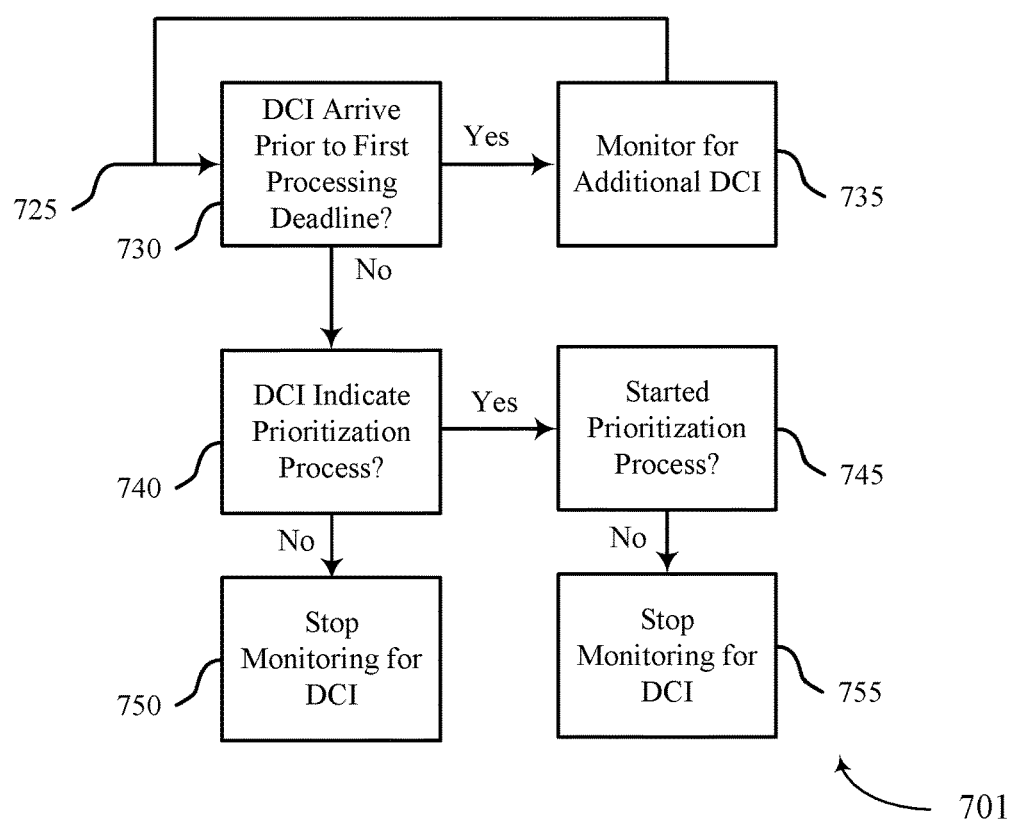
FIG. 7B illustrates an example of a procedure that supports a framework for indication of an overlap resolution process in accordance with one or more aspects of the present disclosure.

FIG. 7B illustrates an example of a procedure 701 that supports a framework for indication of an overlap resolution process in accordance with one or more aspects of the present disclosure. The procedure 701 may implement or be implemented by one or more aspects of the wireless communications system 100 and the wireless communications system 200. For example, the procedure 701 may be implemented by a network entity 105 or a UE 115, which may be examples of the corresponding devices as described with reference to FIGS. 1 and 2.

In some examples, if a DCI message received after a first processing deadline for multiplexing transmissions of different priorities indicates for the UE 115 to perform the prioritization process and the UE 115 started a multiplexing process, the UE 115 may not be capable of multiplexing the transmission scheduled by the DCI message. Therefore, as illustrated in the example of FIG. 7B, the UE may determine to refrain from transmitting the transmission scheduled by the DCI message (e.g., received after the second processing deadline) and refrain from monitoring for additional DCI messages.

For example, at 725, the UE 115 may receive a DCI message scheduling one or multiple transmissions to be performed by the UE 115. The DCI message may include an indication of a transmission-specific overlap resolution process. The transmission-specific overlap resolution process may be an example of a transmission-specific overlap resolution process as described with reference to FIGS. 2 through 4. For example, the transmission-specific overlap resolution process may include a first multiplexing process or a prioritization process. The first multiplexing process and the prioritization process may be examples of the corresponding processes as described with reference to FIGS. 2 through 4. For example, the first multiplexing process may be an overlap resolution process in which the UE 115 may multiplex transmissions regardless of priority and the prioritization process may be an overlap resolution process in which the UE 115 multiplexes transmissions based on priority. At 730, the UE 115 may determine whether the DCI message was received (e.g., arrived) prior to the first processing deadline for multiplexing transmissions of different priorities. The first processing deadline may be an example of a first processing deadline as described with reference to FIG. 4.

At 735, if the DCI message was received by the UE 115 prior to the first processing deadline, the UE 115 may monitor for additional DCI messages (e.g., up to the first processing deadline). At 740, if the DCI message was not received by the UE 115 prior to the first processing deadline, the UE 115 may determine whether the transmission-specific overlap resolution process indicated by the DCI message is the prioritization process. At 750, if the DCI message did not indicate a prioritization process (e.g., if the DCI message indicated the first multiplexing process), the UE 115 may stop monitoring for additional DCI message. Additionally, or alternatively, the UE 115 may refrain from transmitting (e.g., drop, cancel) transmissions scheduled by the DCI message.

At 745, if the transmission-specific overlap resolution process indicated by the DCI message is the prioritization process, the UE 115 may determine whether the UE 115 has started (e.g., or has previously received an indication to perform) a prioritization process. For example, another DCI message received prior to the first processing deadline may have indicated for the UE to perform a transmission-specific overlap resolution process that the UE 115 may have started after the first processing deadline passed. Additionally, or alternatively, the UE 115 may have started a default overlap resolution process indicated by an RRC message after the first processing deadline passed (e.g., if DCI messages received prior to the first processing deadline failed to include an indication of a transmission-specific overlap resolution process). At 755, if the UE 115 has not started the prioritization process (e.g., if the UE 115 has started the first multiplexing process), the UE 115 may stop monitoring for additional DCI messages. Additionally, or alternatively, the UE 115 may drop transmissions scheduled by the DCI message.

Figure 8:
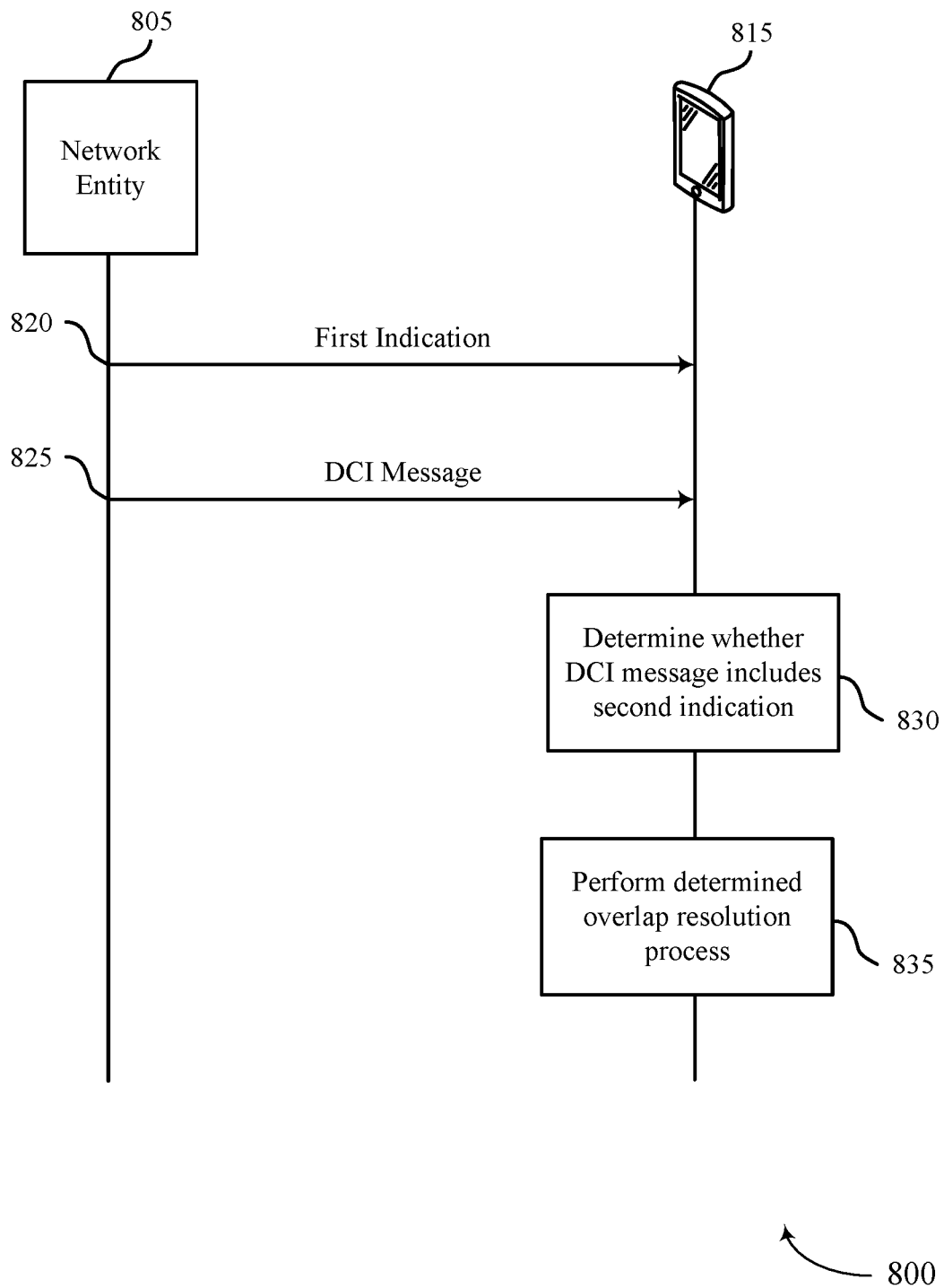
FIG. 8 illustrates an example of a process flow that supports a framework for indication of an overlap resolution process in accordance with one or more aspects of the present disclosure.

FIG. 8 illustrates an example of a process flow 800 that supports a framework for indication of an overlap resolution process in accordance with one or more aspects of the present disclosure. For example, the process flow 800 may include example operations associated with a UE 815 and a network entity 805, which may be examples of the corresponding devices as described with reference to FIGS. 1 and 2. The operations performed by the UE 815 and the network entity 805 may support improvements to communications between the UE 815 and the network, among other benefits. In the following description of the process flow 800, operations between the UE 815 and the network entity 805 may occur in a different order or at different times than as shown. Some operations may also be omitted from the process flow 800, and other operations may be added to the process flow 800.

At 820, the UE 815 may receive a first indication of a default overlap resolution process for application by the UE 815 on a plurality of overlapping transmissions. The default overlap resolution process may be an example of a default overlap resolution process as described with reference to FIGS. 2 and 3. For example, the default overlap resolution process may be indicated to the UE 815 through semi-static signaling, such as via an RRC message. At 825 the UE 115 may receive one or more first DCI messages of a plurality of DCI messages that collectively schedule the plurality of overlapping transmissions. The one or more first DCI messages may be received by the UE 115 prior to the processing deadline. In some examples, the processing deadline as described with reference to FIGS. 2 through 4. For example, the processing deadline may be an example of a processing deadline for multiplexing transmissions of different priorities.

At 830 the UE 115 may determine whether any one of the one or more first DCI messages includes a second indication of a transmission-specific overlap resolution process for application by the UE 815 on a first two or more overlapping transmissions of the plurality of overlapping transmissions. The transmission-specific overlap resolution process may be an example of a transmission-specific overlap resolution process as described with reference to FIGS. 2 through 4. For example, the transmission-specific overlap resolution process may be a multiplexing process or a prioritization process. In some examples, the UE 815 may determine whether any one of the one or more first DCI messages includes the second indication based on the processing deadline having passed for multiplexing the plurality of overlapping transmissions and the one or more first DCI messages being received prior to the processing deadline. At 835 the UE 115 may perform a determined overlap resolution process comprising either the transmission-specific overlap resolution process indicated by one of the one or more first DCI messages or the default overlap resolution process.

Figure 9:
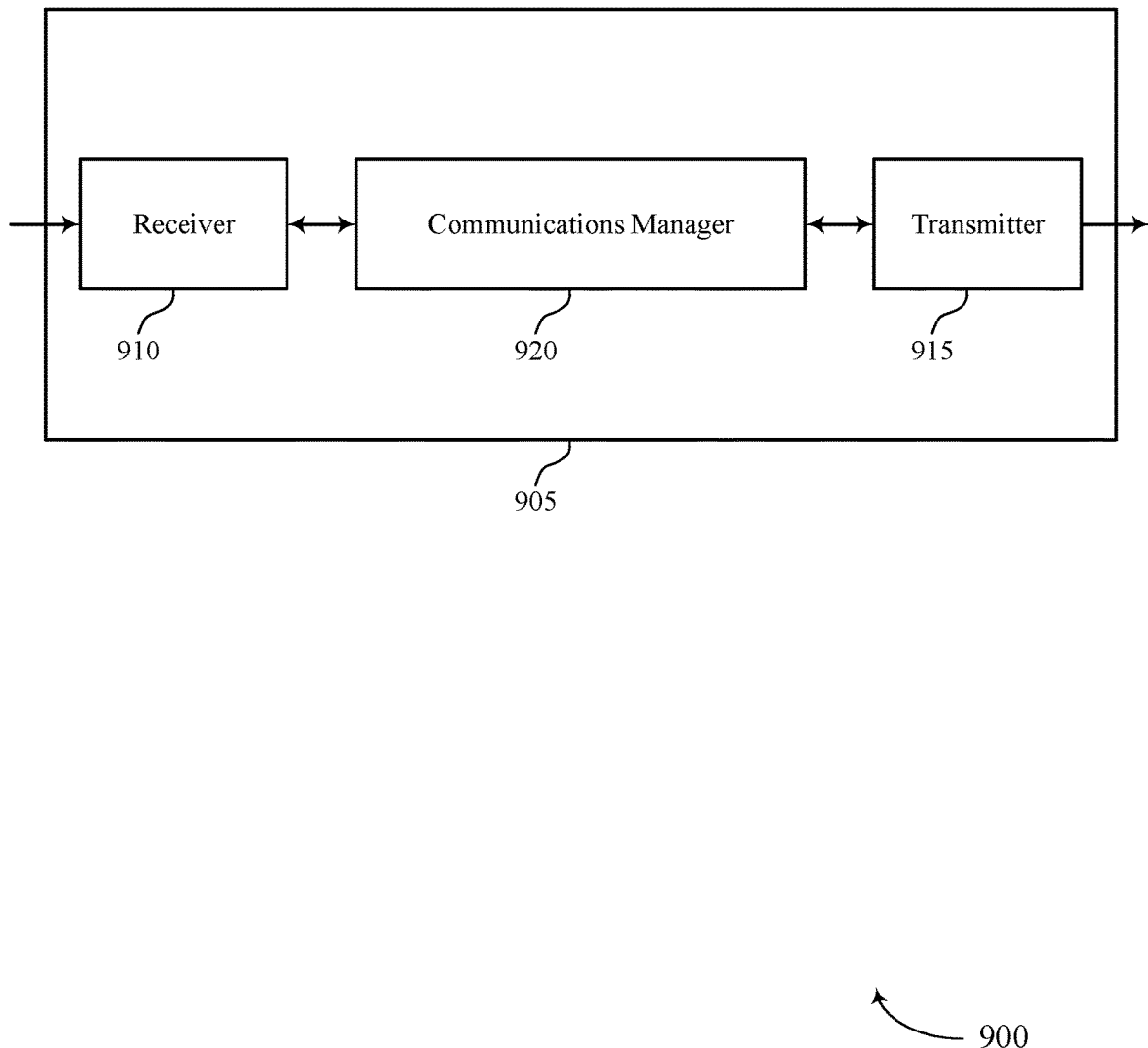
FIGS. 9 and 10 show block diagrams of devices that support a framework for indication of an overlap resolution process in accordance with one or more aspects of the present disclosure.

FIG. 9 shows a block diagram 900 of a device 905 that supports a framework for indication of an overlap resolution process in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a framework for indication of an overlap resolution process). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a framework for indication of an overlap resolution process). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of a framework for indication of an overlap resolution process as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE (e.g., the device 905) in accordance with examples as disclosed herein. For example, the communications manager 920 may be configured as or otherwise support a means for receiving a first indication of a default overlap resolution process for application by the UE on a set of multiple overlapping transmissions. The communications manager 920 may be configured as or otherwise support a means for receiving one or more first DCI messages of a set of multiple DCI messages that collectively schedule the set of multiple overlapping transmissions. The communications manager 920 may be configured as or otherwise support a means for determining, based on a processing deadline having passed for multiplexing the set of multiple overlapping transmissions, the one or more first DCI messages received prior to the processing deadline, whether any one of the one or more first DCI messages includes a second indication of a transmission-specific overlap resolution process for application by the UE on a first two or more overlapping transmissions of the set of multiple overlapping transmissions. The communications manager 920 may be configured as or otherwise support a means for performing a determined overlap resolution process including either the transmission-specific overlap resolution process indicated by one of the one or more first DCI messages or the default overlap resolution process.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, and more efficient utilization of communication resources.

Figure 10:
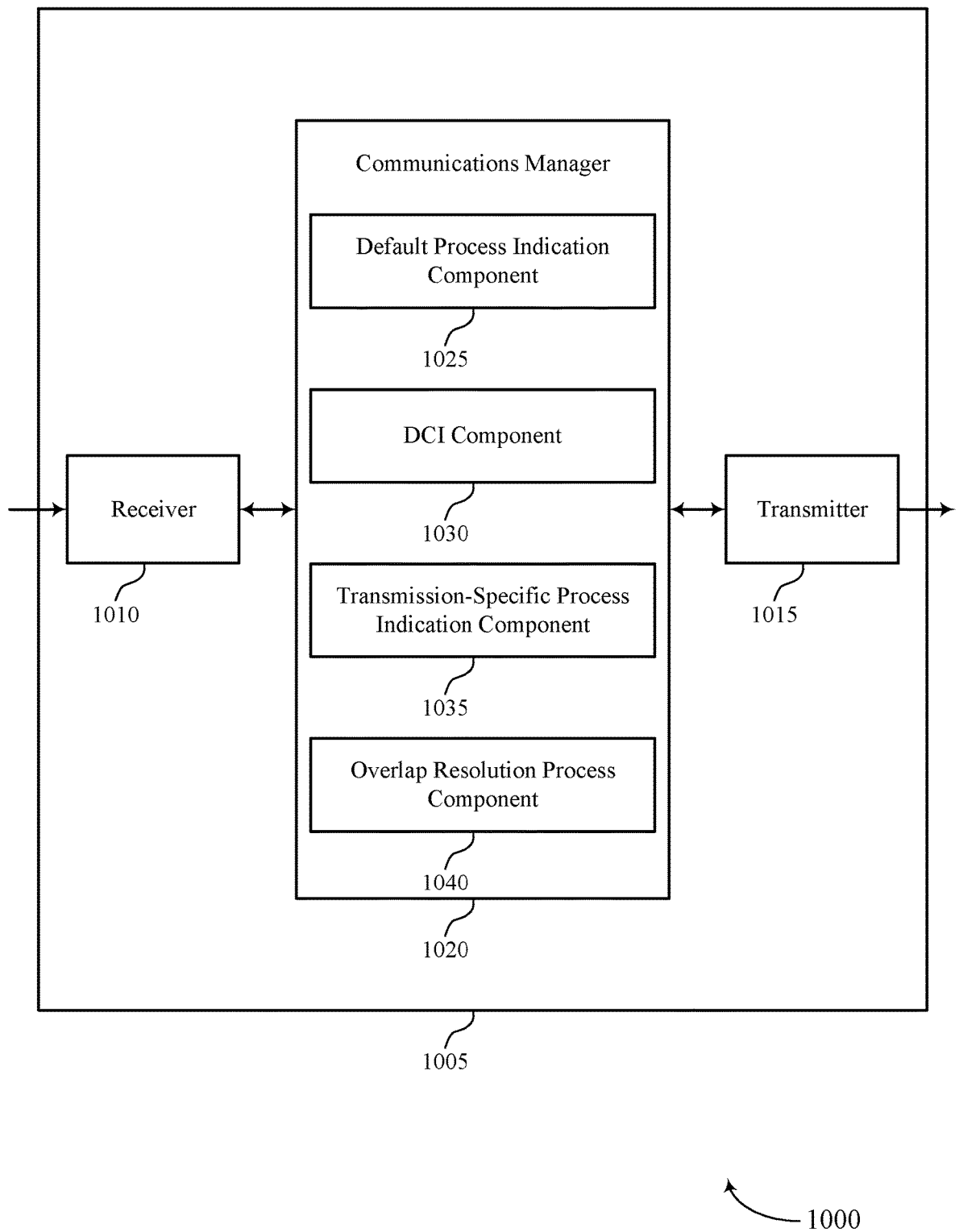

FIG. 10 shows a block diagram 1000 of a device 1005 that supports a framework for indication of an overlap resolution process in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a framework for indication of an overlap resolution process). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a framework for indication of an overlap resolution process). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of a framework for indication of an overlap resolution process as described herein. For example, the communications manager 1020 may include a default process indication component 1025, a DCI component 1030, a transmission-specific process indication component 1035, an overlap resolution process component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE (e.g., the device 1005) in accordance with examples as disclosed herein. The default process indication component 1025 may be configured as or otherwise support a means for receiving a first indication of a default overlap resolution process for application by the UE on a set of multiple overlapping transmissions. The DCI component 1030 may be configured as or otherwise support a means for receiving one or more first DCI messages of a set of multiple DCI messages that collectively schedule the set of multiple overlapping transmissions. The transmission-specific process indication component 1035 may be configured as or otherwise support a means for determining, based on a processing deadline having passed for multiplexing the set of multiple overlapping transmissions, the one or more first DCI messages received prior to the processing deadline, whether any one of the one or more first DCI messages includes a second indication of a transmission-specific overlap resolution process for application by the UE on a first two or more overlapping transmissions of the set of multiple overlapping transmissions. The overlap resolution process component 1040 may be configured as or otherwise support a means for performing a determined overlap resolution process including either the transmission-specific overlap resolution process indicated by one of the one or more first DCI messages or the default overlap resolution process.

Figure 11:
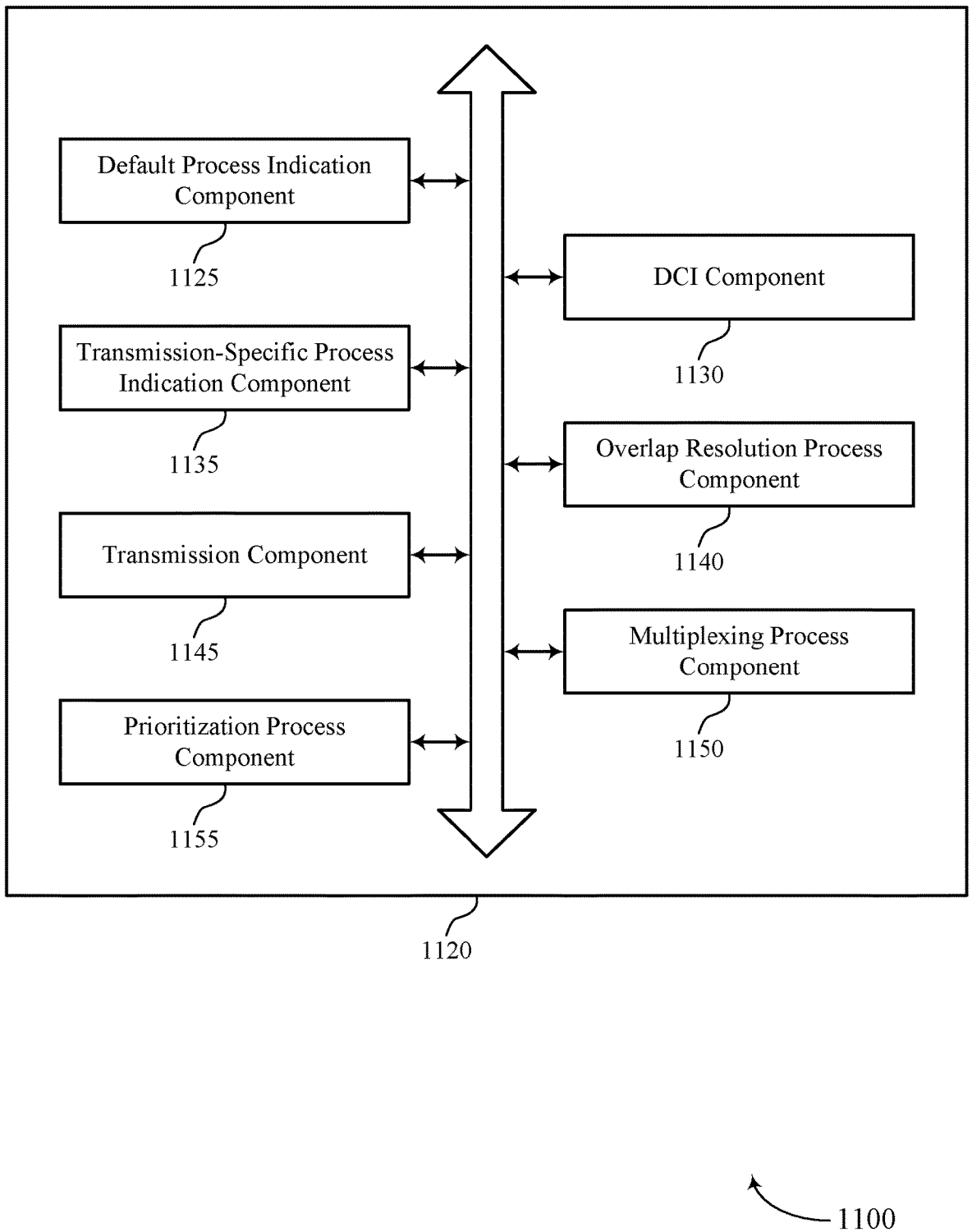
FIG. 11 shows a block diagram of a communications manager that supports a framework for indication of an overlap resolution process in accordance with one or more aspects of the present disclosure.

FIG. 11 shows a block diagram 1100 of a communications manager 1120 that supports a framework for indication of an overlap resolution process in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of a framework for indication of an overlap resolution process as described herein. For example, the communications manager 1120 may include a default process indication component 1125, a DCI component 1130, a transmission-specific process indication component 1135, an overlap resolution process component 1140, a transmission component 1145, a multiplexing process component 1150, a prioritization process component 1155, or any combination thereof. Each of these components may communicate, directly or indirectly, with one another (e.g., via one or more buses).

The communications manager 1120 may support wireless communication at a UE (e.g., a UE 115) in accordance with examples as disclosed herein. The default process indication component 1125 may be configured as or otherwise support a means for receiving a first indication of a default overlap resolution process for application by the UE on a set of multiple overlapping transmissions. The DCI component 1130 may be configured as or otherwise support a means for receiving one or more first DCI messages of a set of multiple DCI messages that collectively schedule the set of multiple overlapping transmissions. The transmission-specific process indication component 1135 may be configured as or otherwise support a means for determining, based on a processing deadline having passed for multiplexing the set of multiple overlapping transmissions, the one or more first DCI messages received prior to the processing deadline, whether any one of the one or more first DCI messages includes a second indication of a transmission-specific overlap resolution process for application by the UE on a first two or more overlapping transmissions of the set of multiple overlapping transmissions. The overlap resolution process component 1140 may be configured as or otherwise support a means for performing a determined overlap resolution process including either the transmission-specific overlap resolution process indicated by one of the one or more first DCI messages or the default overlap resolution process.

In some examples, to support determining whether any one of the one or more first DCI messages includes the second indication, the DCI component 1130 may be configured as or otherwise support a means for determining that a triggering DCI message of the one or more first DCI messages includes the second indication of the transmission-specific overlap resolution process, where the transmission-specific overlap resolution process is the determined overlap resolution process based on the second indication being included in any of the one or more first DCI messages. In some examples, the triggering DCI message is a temporally last DCI message of the one or more first DCI messages.

In some examples, to support determining whether any one of the one or more first DCI messages includes the second indication, the DCI component 1130 may be configured as or otherwise support a means for determining that the one or more first DCI messages fail to include the second indication of the transmission-specific overlap resolution process, where the default overlap resolution process is the determined overlap resolution process based on the second indication not being included in any of the one or more first DCI messages.

In some examples, to support performing the determined overlap resolution process, the overlap resolution process component 1140 may be configured as or otherwise support a means for performing one of a multiplexing process or a prioritization process as part of the determined overlap resolution process.

In some examples, to support performing one of the multiplexing process or the prioritization process, the multiplexing process component 1150 may be configured as or otherwise support a means for performing the multiplexing process, which includes. In some examples, to support performing one of the multiplexing process or the prioritization process, the multiplexing process component 1150 may be configured as or otherwise support a means for multiplexing the set of multiple overlapping transmissions regardless of a priority index associated with each overlapping transmission of the set of multiple overlapping transmissions.

In some examples, to support performing one of the multiplexing process or the prioritization process, the prioritization process component 1155 may be configured as or otherwise support a means for performing the prioritization process, which includes. In some examples, to support performing one of the multiplexing process or the prioritization process, the prioritization process component 1155 may be configured as or otherwise support a means for prioritizing each of the set of multiple overlapping transmissions based on a respective priority index associated with each overlapping transmission of the set of multiple overlapping transmissions.

In some examples, the prioritization process component 1155 may be configured as or otherwise support a means for multiplexing at least two overlapping transmissions of the set of multiple overlapping transmissions, the at least two overlapping transmissions associated with a first priority index. In some examples, the transmission component 1145 may be configured as or otherwise support a means for refraining from transmitting remaining overlapping transmissions of the set of multiple overlapping transmissions, the remaining overlapping transmissions associated with a second priority index.

In some examples, to support refraining from transmitting the remaining overlapping transmissions, the transmission component 1145 may be configured as or otherwise support a means for dropping the remaining overlapping transmissions subsequent to the processing deadline. In some examples, the first priority index corresponds to a high priority and the second priority index corresponds to a low priority which is less than the high priority.

In some examples, the DCI component 1130 may be configured as or otherwise support a means for determining that a second DCI message of the set of multiple DCI messages includes the second indication of the transmission-specific overlap resolution process, the second DCI message received after the processing deadline and scheduling an additional transmission of the set of multiple overlapping transmissions. In some examples, the transmission-specific process indication component 1135 may be configured as or otherwise support a means for determining that the second indication of the transmission-specific overlap resolution process included in the second DCI message indicates a prioritization process and that the determined overlap resolution process is also the prioritization process. In some examples, the overlap resolution process component 1140 may be configured as or otherwise support a means for performing the determined overlap resolution process for the additional transmission based on the determined overlap resolution process being the prioritization process and being consistent with the second indication included in the second DCI message.

In some examples, to support performing the determined overlap resolution process, the prioritization process component 1155 may be configured as or otherwise support a means for performing the prioritization process, which includes. In some examples, to support performing the determined overlap resolution process, the prioritization process component 1155 may be configured as or otherwise support a means for prioritizing each of the set of multiple overlapping transmissions based on a respective priority index associated with each overlapping transmission of the set of multiple overlapping transmissions. In some examples, to support performing the determined overlap resolution process, the prioritization process component 1155 may be configured as or otherwise support a means for multiplexing at least two overlapping transmissions of the set of multiple overlapping transmissions based on the second DCI message being received prior to a second processing deadline, where the at least two overlapping transmissions are associated with a first priority index.

In some examples, the DCI component 1130 may be configured as or otherwise support a means for determining that a second DCI message of the set of multiple DCI messages includes the second indication of the transmission-specific overlap resolution process, the second DCI message received after the processing deadline and scheduling an additional transmission of the set of multiple overlapping transmissions. In some examples, the transmission-specific process indication component 1135 may be configured as or otherwise support a means for determining that the second indication of the transmission-specific overlap resolution process included in the second DCI message indicates a prioritization process and that the determined overlap resolution process is a multiplexing process. In some examples, the transmission component 1145 may be configured as or otherwise support a means for refraining from transmitting the additional transmission and from monitoring for one or more additional DCI messages based on the determined overlap resolution process being the multiplexing process and being inconsistent with the second indication included in the second DCI message.

In some examples, the DCI component 1130 may be configured as or otherwise support a means for determining that a second DCI message of the set of multiple DCI messages includes the second indication of the transmission-specific overlap resolution process, the second DCI message received after the processing deadline and scheduling an additional transmission of the set of multiple overlapping transmissions. In some examples, the transmission-specific process indication component 1135 may be configured as or otherwise support a means for determining that the second indication of the transmission-specific overlap resolution process included in the second DCI message indicates a multiplexing process. In some examples, the transmission component 1145 may be configured as or otherwise support a means for refraining from transmitting the additional transmission and from monitoring for one or more additional DCI messages based on the second indication of the transmission-specific overlap resolution process included in the second DCI message indicating a multiplexing process.

Figure 12:
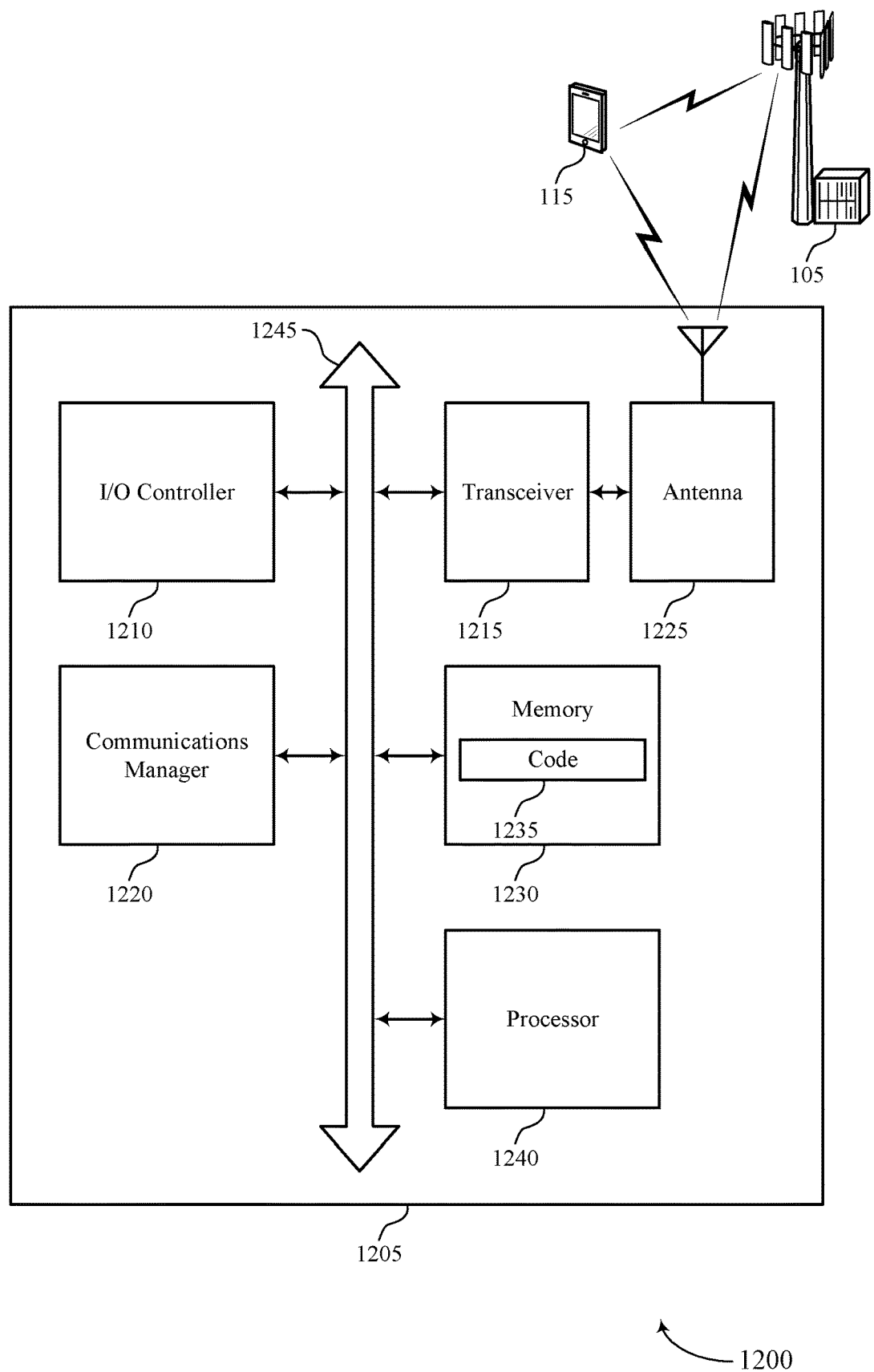
FIG. 12 shows a diagram of a system including a device that supports a framework for indication of an overlap resolution process in accordance with one or more aspects of the present disclosure.

FIG. 12 shows a diagram of a system 1200 including a device 1205 that supports a framework for indication of an overlap resolution process in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting a framework for indication of an overlap resolution process). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE (the device 1205) in accordance with examples as disclosed herein. For example, the communications manager 1220 may be configured as or otherwise support a means for receiving a first indication of a default overlap resolution process for application by the UE on a set of multiple overlapping transmissions. The communications manager 1220 may be configured as or otherwise support a means for receiving one or more first DCI messages of a set of multiple DCI messages that collectively schedule the set of multiple overlapping transmissions. The communications manager 1220 may be configured as or otherwise support a means for determining, based on a processing deadline having passed for multiplexing the set of multiple overlapping transmissions, the one or more first DCI messages received prior to the processing deadline, whether any one of the one or more first DCI messages includes a second indication of a transmission-specific overlap resolution process for application by the UE on a first two or more overlapping transmissions of the set of multiple overlapping transmissions. The communications manager 1220 may be configured as or otherwise support a means for performing a determined overlap resolution process including either the transmission-specific overlap resolution process indicated by one of the one or more first DCI messages or the default overlap resolution process.

By including or configuring the communications manager 1220 in accordance with examples as described herein, the device 1205 may support techniques for improved communication reliability, reduced latency, improved user experience related to reduced processing, more efficient utilization of communication resources, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of a framework for indication of an overlap resolution process as described herein, or the processor 1240 and the memory 1230 may be otherwise configured to perform or support such operations.

Figure 13:
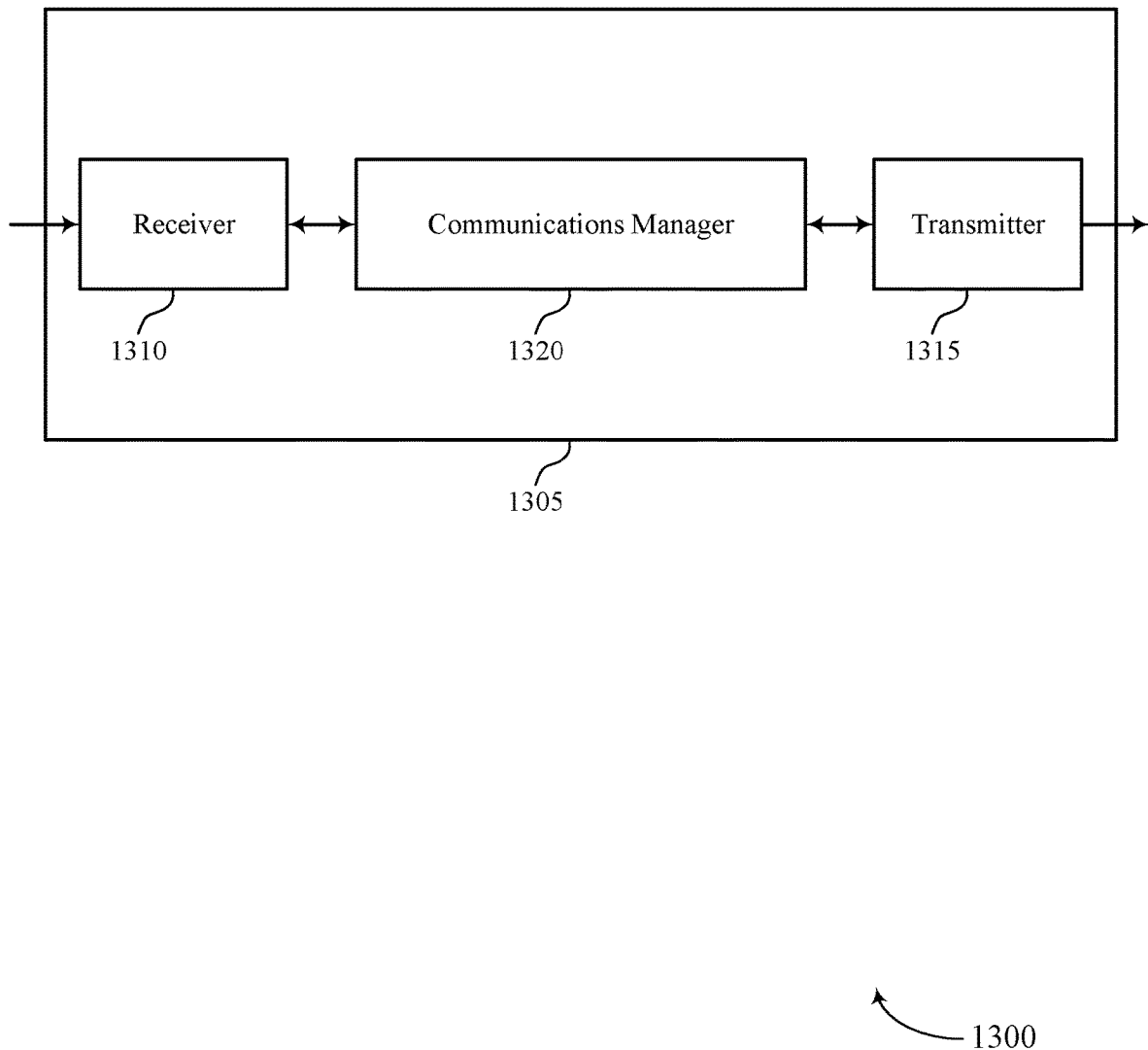
FIGS. 13 and 14 show block diagrams of devices that support a framework for indication of an overlap resolution process in accordance with one or more aspects of the present disclosure.

FIG. 13 shows a block diagram 1300 of a device 1305 that supports a framework for indication of an overlap resolution process in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of a framework for indication of an overlap resolution process as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity (e.g., the device 1305) in accordance with examples as disclosed herein. For example, the communications manager 1320 may be configured as or otherwise support a means for outputting an RRC message including a first indication of a default overlap resolution process for application by a UE on a set of multiple overlapping transmissions. The communications manager 1320 may be configured as or otherwise support a means for outputting one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing and more efficient utilization of communication resources.

Figure 14:
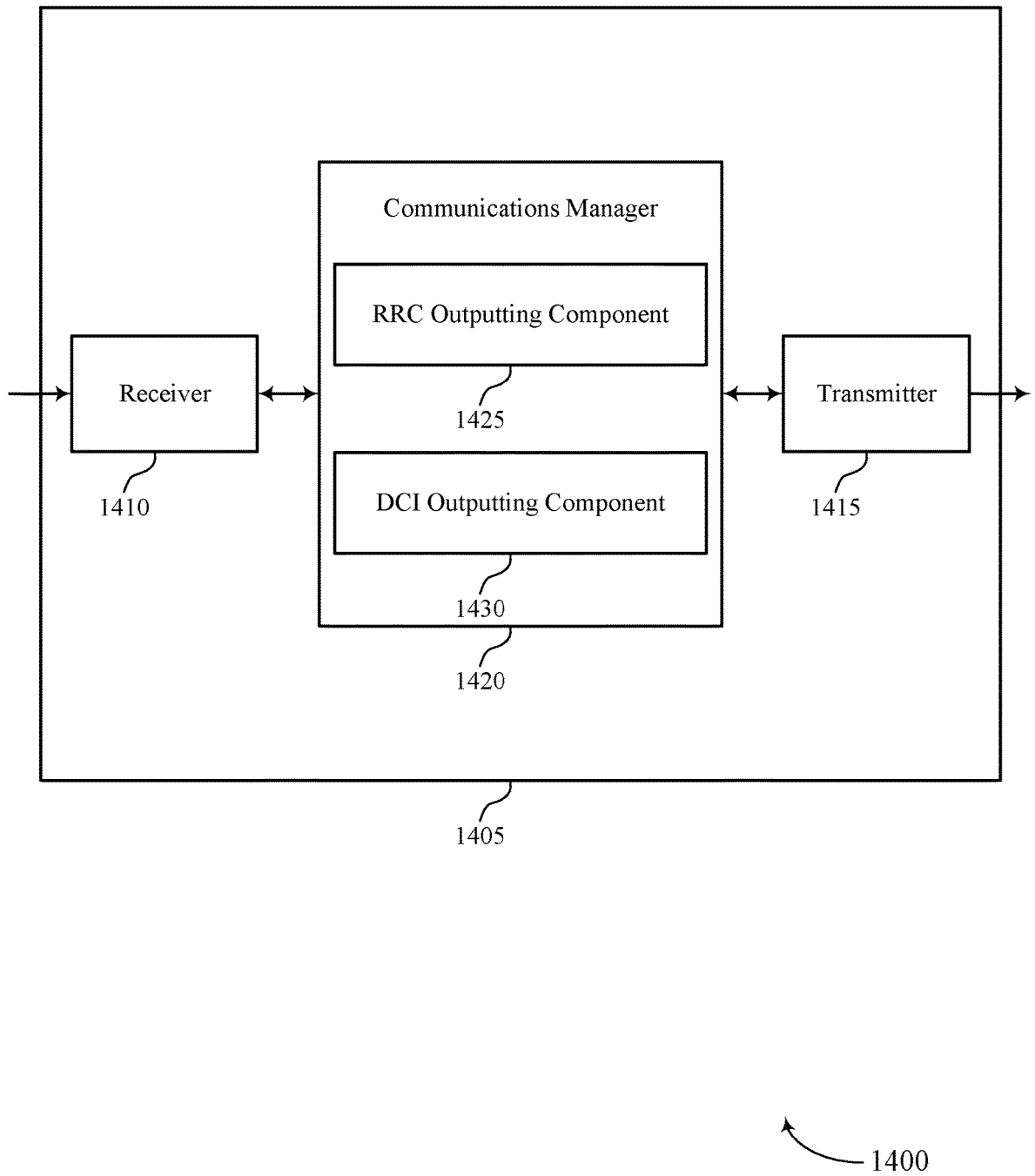

FIG. 14 shows a block diagram 1400 of a device 1405 that supports a framework for indication of an overlap resolution process in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of a framework for indication of an overlap resolution process as described herein. For example, the communications manager 1420 may include an RRC outputting component 1425 a DCI outputting component 1430, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity (e.g., the device 1405) in accordance with examples as disclosed herein. The RRC outputting component 1425 may be configured as or otherwise support a means for outputting an RRC message including a first indication of a default overlap resolution process for application by a UE on a set of multiple overlapping transmissions. The DCI outputting component 1430 may be configured as or otherwise support a means for outputting one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions.

Figure 15:
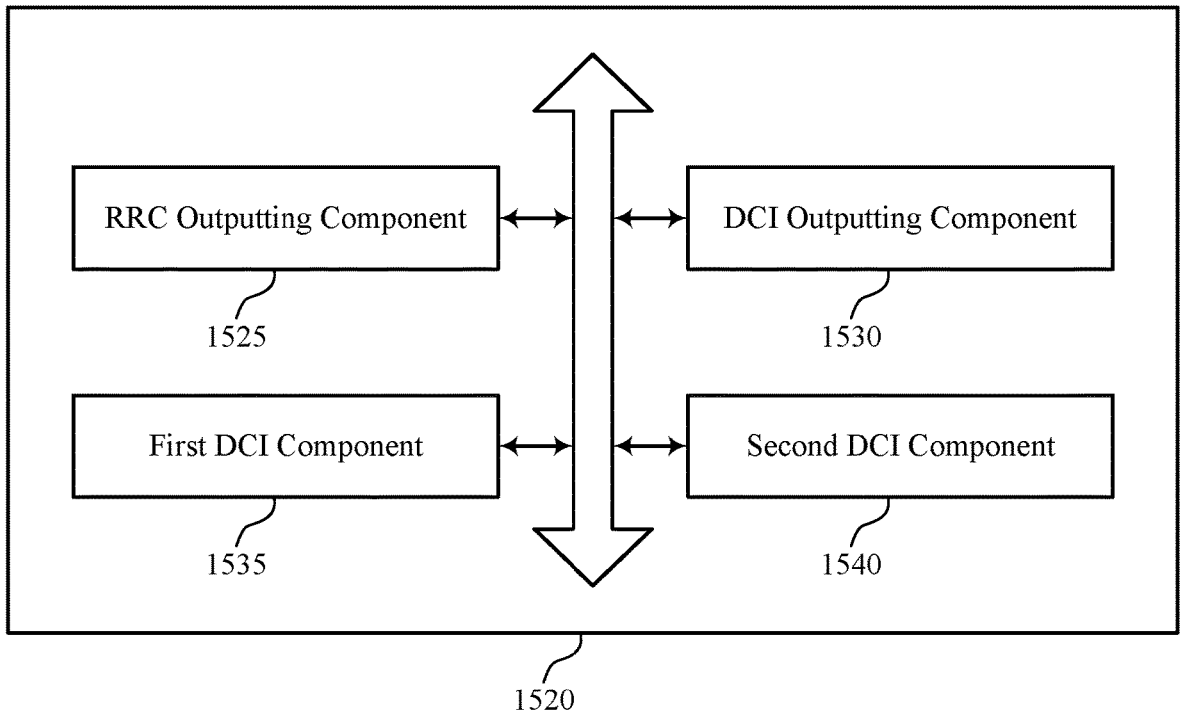
FIG. 15 shows a block diagram of a communications manager that supports a framework for indication of an overlap resolution process in accordance with one or more aspects of the present disclosure.

FIG. 15 shows a block diagram 1500 of a communications manager 1520 that supports a framework for indication of an overlap resolution process in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of a framework for indication of an overlap resolution process as described herein. For example, the communications manager 1520 may include an RRC outputting component 1525, a DCI outputting component 1530, a first DCI component 1535, a second DCI component 1540, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a network entity (e.g., a network entity 105) in accordance with examples as disclosed herein. The RRC outputting component 1525 may be configured as or otherwise support a means for outputting an RRC message including a first indication of a default overlap resolution process for application by a UE on a set of multiple overlapping transmissions. The DCI outputting component 1530 may be configured as or otherwise support a means for outputting one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions.

In some examples, the first DCI component 1535 may be configured as or otherwise support a means for determining that a first DCI message of the set of multiple DCI messages is a temporally last DCI message before a processing deadline of the UE, where the first DCI message triggers the UE to perform the transmission-specific overlap resolution process on the first two or more overlapping transmissions.

In some examples, the second DCI component 1540 may be configured as or otherwise support a means for outputting a second DCI message of the one or more DCI messages that includes the second indication of the transmission-specific overlap resolution process, where the second DCI message triggers the UE to perform the transmission-specific overlap resolution process on an additional transmission scheduled by the second DCI message based on the second DCI message being received at the UE after the processing deadline, and the second indication of the transmission-specific overlap resolution process included in both the second DCI message and the first DCI message indicating a prioritization process.

In some examples, the second DCI component 1540 may be configured as or otherwise support a means for outputting a second DCI message of the one or more DCI messages that includes the second indication of the transmission-specific overlap resolution process, where the second DCI message triggers the UE to refrain from transmitting an additional transmission scheduled by the second DCI message and from monitoring for one or more additional DCI messages based on the second DCI message being received at the UE after the processing deadline, the second indication of the transmission-specific overlap resolution process included in the second DCI message indicating a prioritization process, and the second indication of the transmission-specific overlap resolution process included in the first DCI message indicating a multiplexing process.

In some examples, the second DCI component 1540 may be configured as or otherwise support a means for outputting a second DCI message of the one or more DCI messages that includes the second indication of the transmission-specific overlap resolution process, where the second DCI message triggers the UE to refrain from transmitting an additional transmission scheduled by the second DCI message and from monitoring for one or more additional DCI messages based on the second DCI message being received at the UE after the processing deadline and the second indication of the transmission-specific overlap resolution process indicating a multiplexing process.

In some examples, the radio resource control message triggers the UE to perform the default overlap resolution process based at least in part on the UE failing to receive a DCI message of the one or more DCI messages that includes the second indication of the transmission-specific overlap resolution process prior to a processing deadline.

In some examples, the transmission-specific overlap resolution process includes either a multiplexing process or a prioritization process. In some examples, the transmission-specific overlap resolution process includes the multiplexing process. In some examples, the multiplexing process includes multiplexing the set of multiple overlapping transmissions regardless of a priority index associated with each overlapping transmission of the set of multiple overlapping transmissions.

In some examples, the transmission-specific overlap resolution process includes the prioritization process. In some examples, the prioritization process includes prioritizing each of the set of multiple overlapping transmissions based on a respective priority index associated with each overlapping transmission of the set of multiple overlapping transmissions.

In some examples, the prioritization process further includes multiplexing at least two overlapping transmissions of the set of multiple overlapping transmissions, the at least two overlapping transmissions associated with a first priority index, and refraining from transmitting remaining overlapping transmissions of the set of multiple overlapping transmissions, the remaining overlapping transmissions associated with a second priority index.

In some examples, refraining from transmitting the remaining overlapping transmissions includes dropping the remaining overlapping transmissions subsequent to a processing deadline. In some examples, the first priority index corresponds to a high priority and the second priority index corresponds to a low priority which is less than the high priority.

Figure 16:
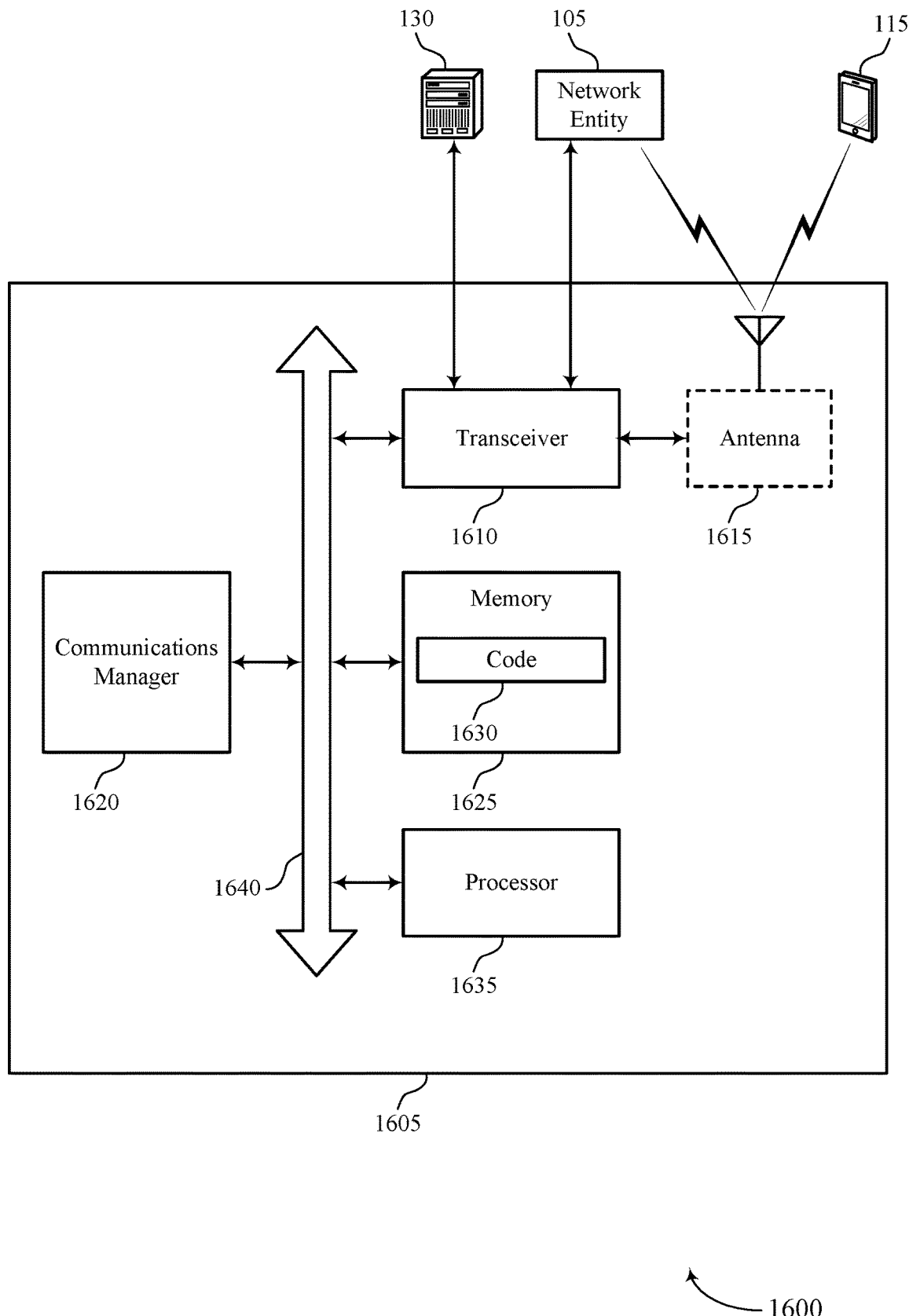
FIG. 16 shows a diagram of a system including a device that supports a framework for indication of an overlap resolution process in accordance with one or more aspects of the present disclosure.

FIG. 16 shows a diagram of a system 1600 including a device 1605 that supports a framework for indication of an overlap resolution process in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. The transceiver 1610, or the transceiver 1610 and one or more antennas 1615 or wired interfaces, where applicable, may be an example of a transmitter 1315, a transmitter 1415, a receiver 1310, a receiver 1410, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting a framework for indication of an overlap resolution process). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a network entity (e.g., the device 1605) in accordance with examples as disclosed herein. For example, the communications manager 1620 may be configured as or otherwise support a means for outputting an RRC message including a first indication of a default overlap resolution process for application by a UE on a set of multiple overlapping transmissions. The communications manager 1620 may be configured as or otherwise support a means for outputting one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions.

By including or configuring the communications manager 1620 in accordance with examples as described herein, the device 1605 may support techniques for improved communication reliability, reduced latency, improved user experience related to reduced processing, more efficient utilization of communication resources, and improved utilization of processing capability.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the processor 1635, the memory 1625, the code 1630, the transceiver 1610, or any combination thereof. For example, the code 1630 may include instructions executable by the processor 1635 to cause the device 1605 to perform various aspects of a framework for indication of an overlap resolution process as described herein, or the processor 1635 and the memory 1625 may be otherwise configured to perform or support such operations.

Figure 17:
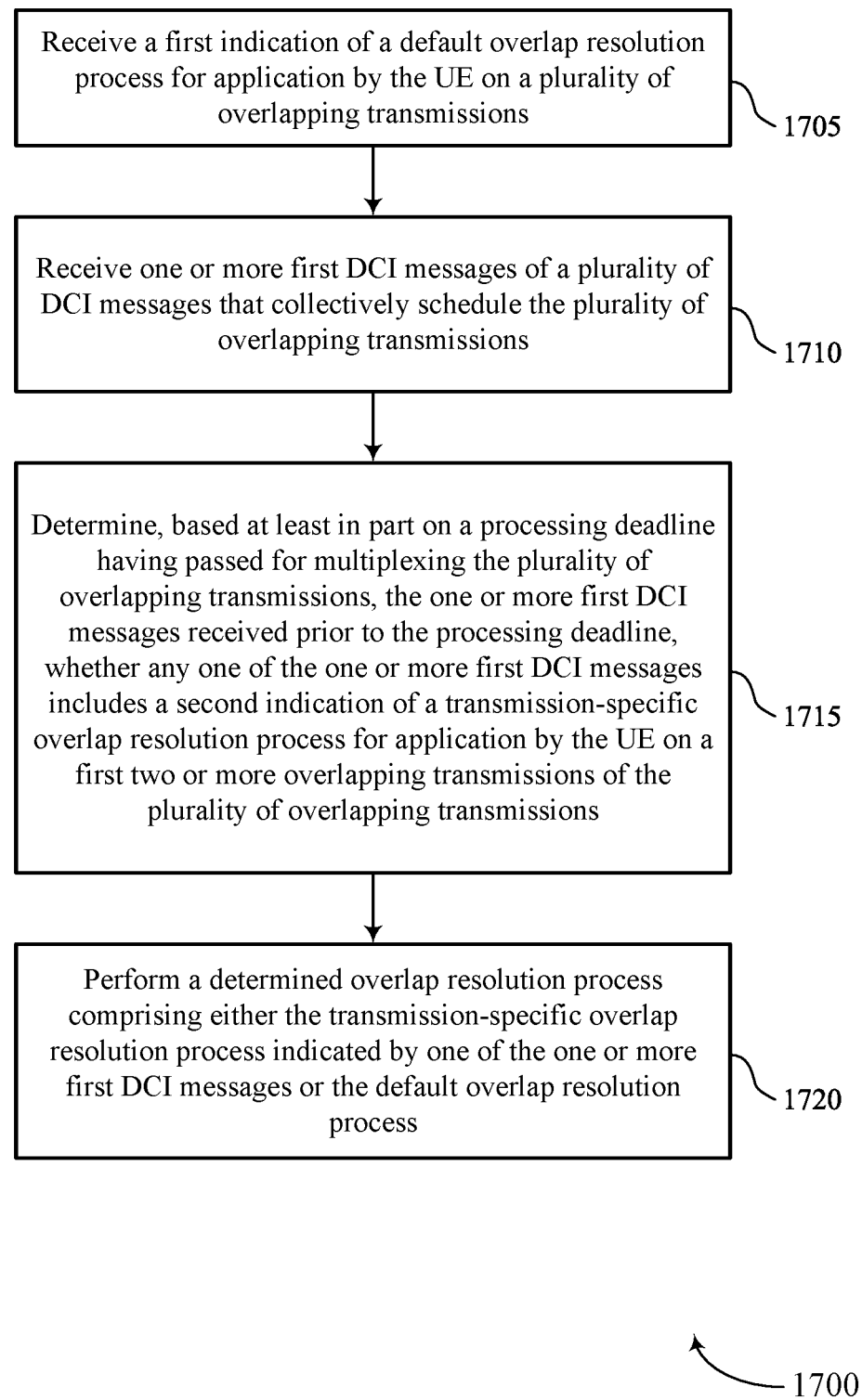
FIGS. 17 through 21 show flowcharts illustrating methods that support a framework for indication of an overlap resolution process in accordance with one or more aspects of the present disclosure.

FIG. 17 shows a flowchart illustrating a method 1700 that supports a framework for indication of an overlap resolution process in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving a first indication of a default overlap resolution process for application by the UE on a set of multiple overlapping transmissions. The operations of 1705 may be performed in accordance with examples as disclosed herein. In some examples, aspects of the operations of 1705 may be performed by a default process indication component 1125 as described with reference to FIG. 11.

At 1710, the method may include receiving one or more first DCI messages of a set of multiple DCI messages that collectively schedule the set of multiple overlapping transmissions. The operations of 1710 may be performed in accordance with examples as disclosed herein. In some examples, aspects of the operations of 1710 may be performed by a DCI component 1130 as described with reference to FIG. 11.

At 1715, the method may include determining, based on a processing deadline having passed for multiplexing the set of multiple overlapping transmissions, the one or more first DCI messages received prior to the processing deadline, whether any one of the one or more first DCI messages includes a second indication of a transmission-specific overlap resolution process for application by the UE on a first two or more overlapping transmissions of the set of multiple overlapping transmissions. The operations of 1715 may be performed in accordance with examples as disclosed herein. In some examples, aspects of the operations of 1715 may be performed by a transmission-specific process indication component 1135 as described with reference to FIG. 11.

At 1720, the method may include performing a determined overlap resolution process including either the transmission-specific overlap resolution process indicated by one of the one or more first DCI messages or the default overlap resolution process. The operations of 1720 may be performed in accordance with examples as disclosed herein. In some examples, aspects of the operations of 1720 may be performed by an overlap resolution process component 1140 as described with reference to FIG. 11.

Figure 18:
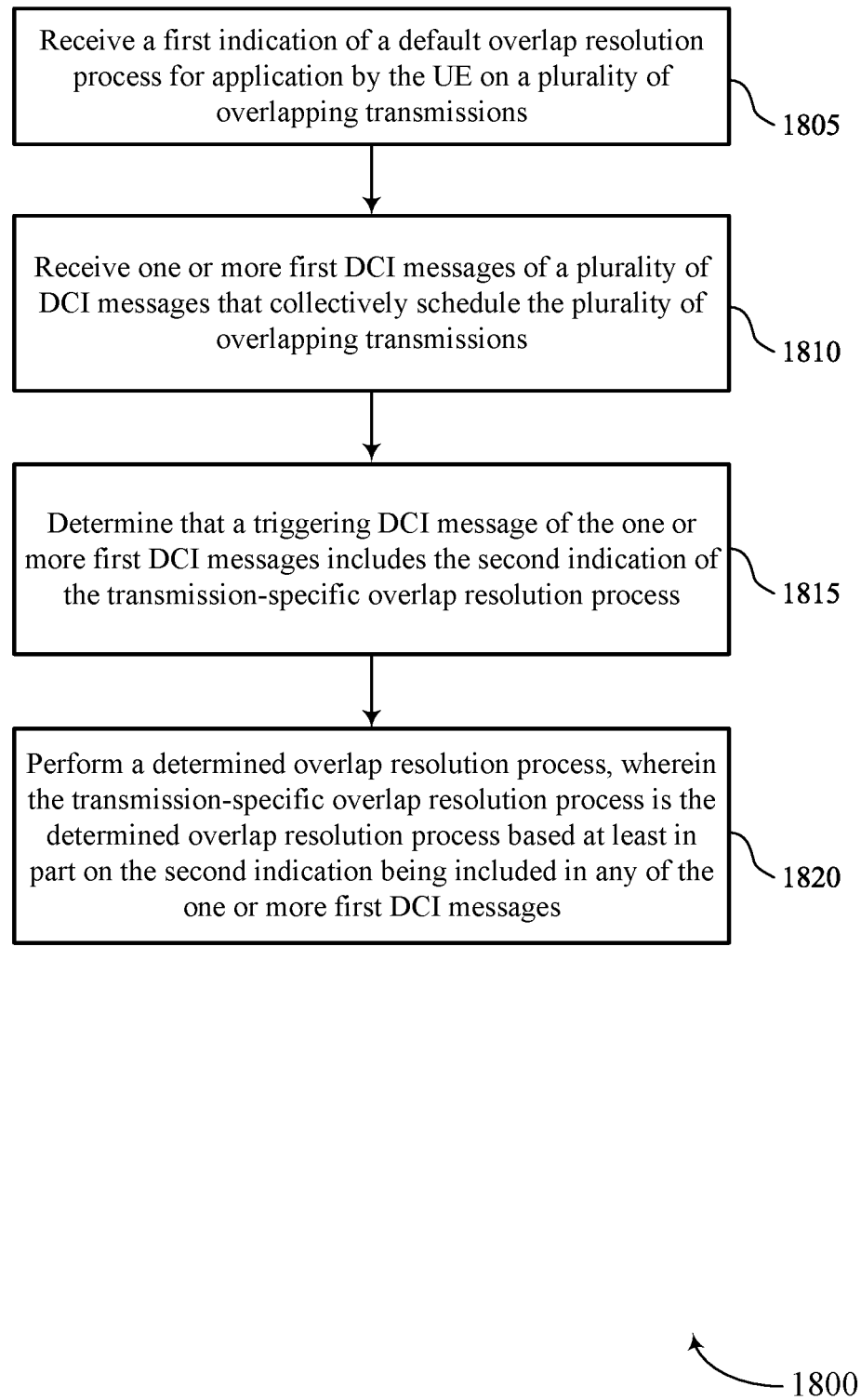

FIG. 18 shows a flowchart illustrating a method 1800 that supports a framework for indication of an overlap resolution process in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving a first indication of a default overlap resolution process for application by the UE on a set of multiple overlapping transmissions. The operations of 1805 may be performed in accordance with examples as disclosed herein. In some examples, aspects of the operations of 1805 may be performed by a default process indication component 1125 as described with reference to FIG. 11.

At 1810, the method may include receiving one or more first DCI messages of a set of multiple DCI messages that collectively schedule the set of multiple overlapping transmissions. The operations of 1810 may be performed in accordance with examples as disclosed herein. In some examples, aspects of the operations of 1810 may be performed by a DCI component 1130 as described with reference to FIG. 11.

At 1815, the method may include determining that a triggering DCI message of the one or more first DCI messages includes the second indication of the transmission-specific overlap resolution process. The operations of 1815 may be performed in accordance with examples as disclosed herein. In some examples, aspects of the operations of 1815 may be performed by a DCI component 1130 as described with reference to FIG. 11.

At 1820, the method may include performing a determined overlap resolution process, where the transmission-specific overlap resolution process is the determined overlap resolution process based on the second indication being included in any of the one or more first DCI messages. The operations of 1820 may be performed in accordance with examples as disclosed herein. In some examples, aspects of the operations of 1820 may be performed by an overlap resolution process component 1140 as described with reference to FIG. 11.

Figure 19:
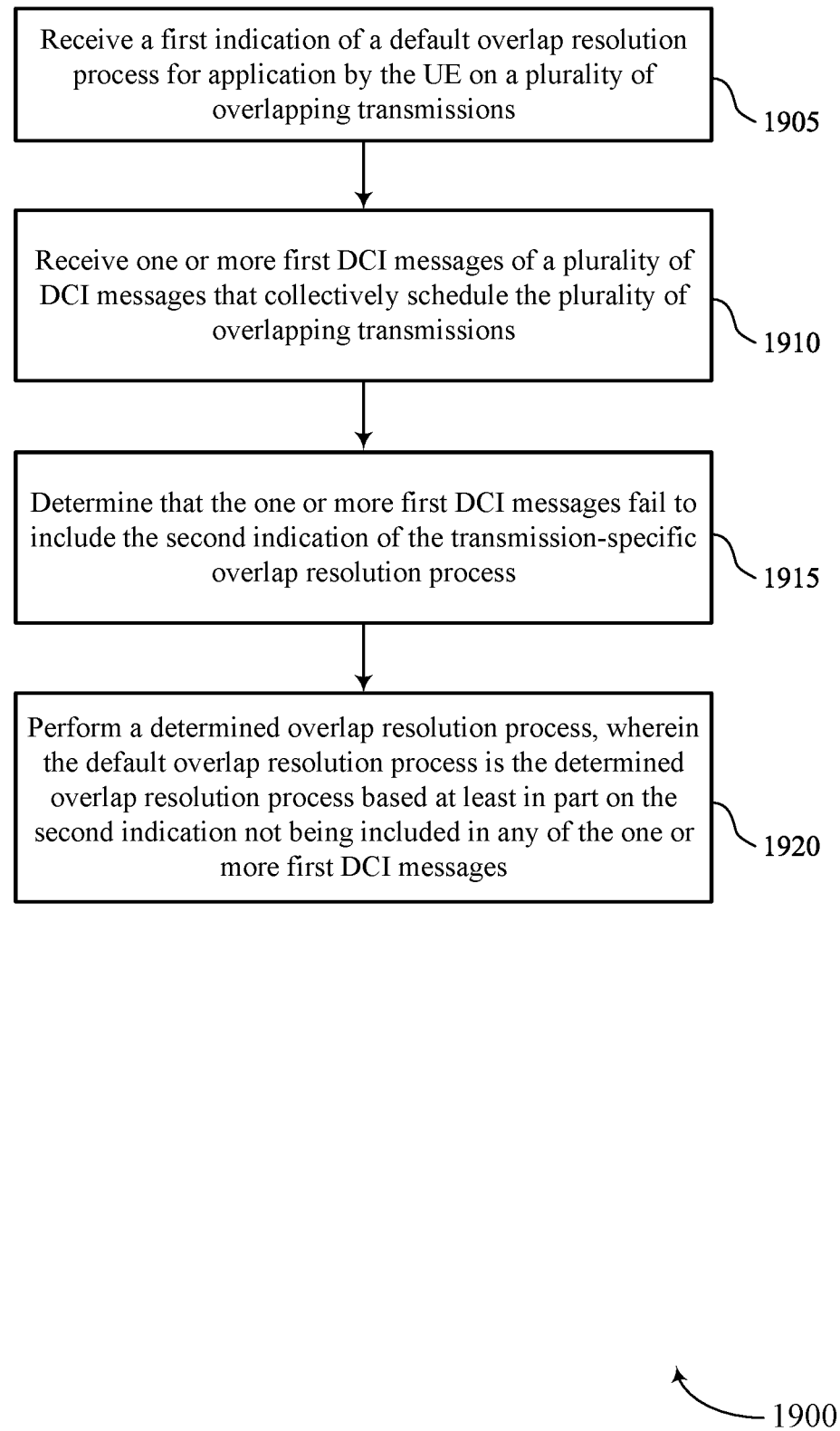

FIG. 19 shows a flowchart illustrating a method 1900 that supports a framework for indication of an overlap resolution process in accordance with one or more aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving a first indication of a default overlap resolution process for application by the UE on a set of multiple overlapping transmissions. The operations of 1905 may be performed in accordance with examples as disclosed herein. In some examples, aspects of the operations of 1905 may be performed by a default process indication component 1125 as described with reference to FIG. 11.

At 1910, the method may include receiving one or more first DCI messages of a set of multiple DCI messages that collectively schedule the set of multiple overlapping transmissions. The operations of 1910 may be performed in accordance with examples as disclosed herein. In some examples, aspects of the operations of 1910 may be performed by a DCI component 1130 as described with reference to FIG. 11.

At 1915, the method may include determining that the one or more first DCI messages fail to include the second indication of the transmission-specific overlap resolution process. The operations of 1915 may be performed in accordance with examples as disclosed herein. In some examples, aspects of the operations of 1915 may be performed by a DCI component 1130 as described with reference to FIG. 11.

At 1920, the method may include performing a determined overlap resolution process, where the default overlap resolution process is the determined overlap resolution process based on the second indication not being included in any of the one or more first DCI messages. The operations of 1920 may be performed in accordance with examples as disclosed herein. In some examples, aspects of the operations of 1920 may be performed by an overlap resolution process component 1140 as described with reference to FIG. 11.

Figure 20:
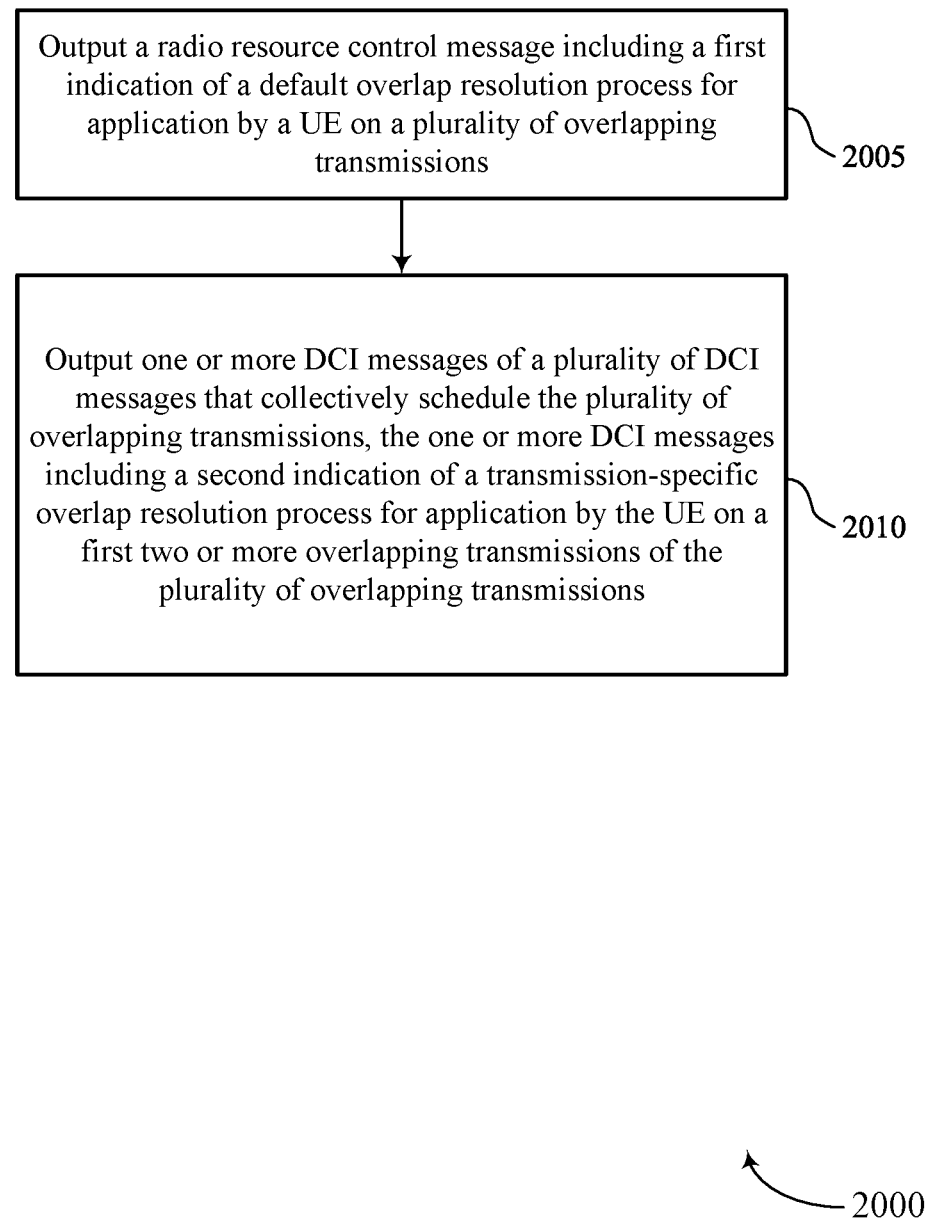

FIG. 20 shows a flowchart illustrating a method 2000 that supports a framework for indication of an overlap resolution process in accordance with one or more aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include outputting an RRC message including a first indication of a default overlap resolution process for application by a UE on a set of multiple overlapping transmissions. The operations of 2005 may be performed in accordance with examples as disclosed herein. In some examples, aspects of the operations of 2005 may be performed by an RRC outputting component 1525 as described with reference to FIG. 15.

At 2010, the method may include outputting one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions. The operations of 2010 may be performed in accordance with examples as disclosed herein. In some examples, aspects of the operations of 2010 may be performed by a DCI outputting component 1530 as described with reference to FIG. 15.

Figure 21:
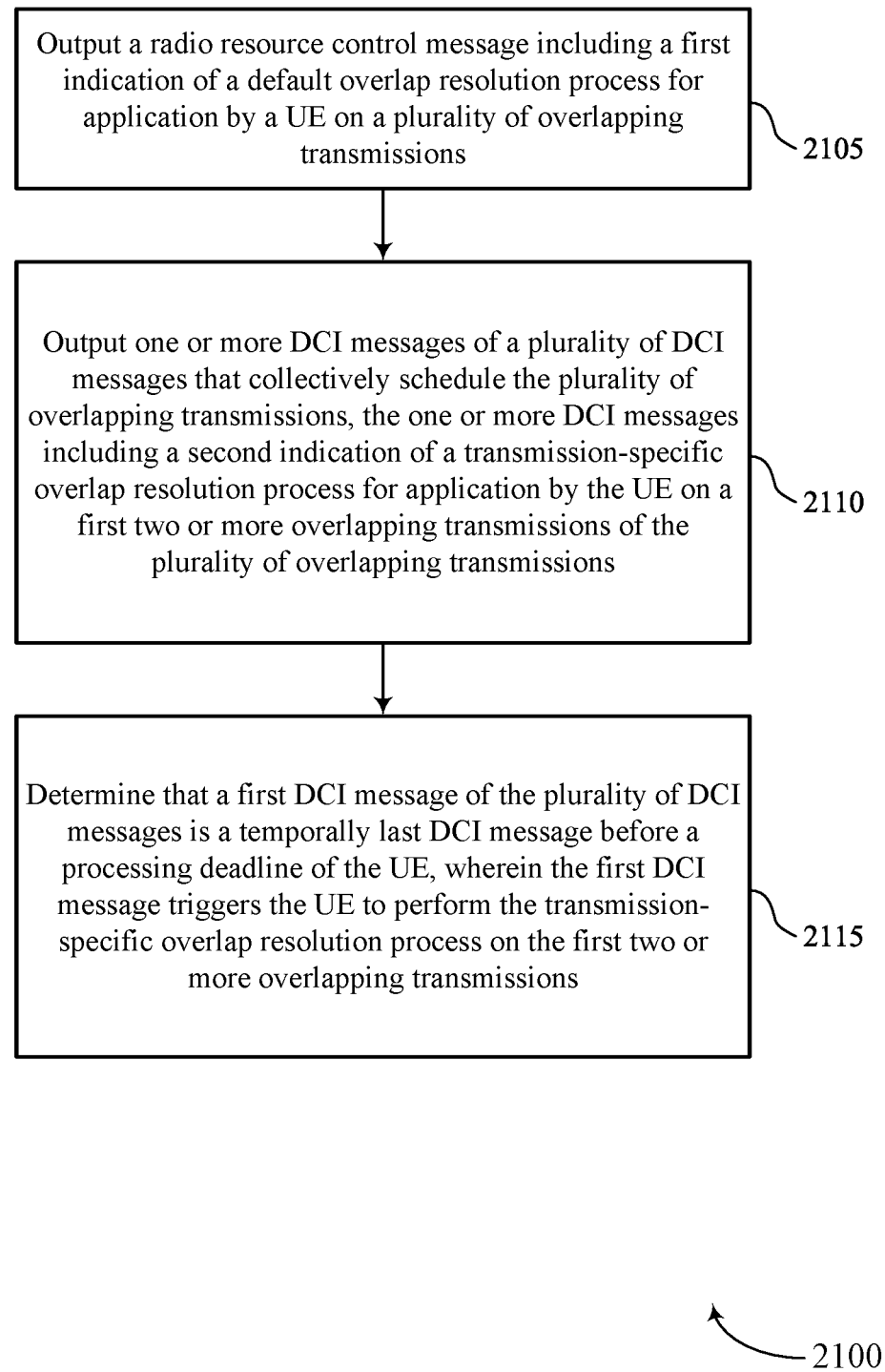

FIG. 21 shows a flowchart illustrating a method 2100 that supports a framework for indication of an overlap resolution process in accordance with one or more aspects of the present disclosure. The operations of the method 2100 may be implemented by a network entity or its components as described herein. For example, the operations of the method 2100 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2105, the method may include outputting an RRC message including a first indication of a default overlap resolution process for application by a UE on a set of multiple overlapping transmissions. The operations of 2105 may be performed in accordance with examples as disclosed herein. In some examples, aspects of the operations of 2105 may be performed by an RRC outputting component 1525 as described with reference to FIG. 15.

At 2110, the method may include outputting one or more DCI messages of a set of multiple DCI messages that collectively schedule the set of multiple overlapping transmissions, the one or more DCI messages including a second indication of a transmission-specific overlap resolution process for application by the UE on a first two or more overlapping transmissions of the set of multiple overlapping transmissions. The operations of 2110 may be performed in accordance with examples as disclosed herein. In some examples, aspects of the operations of 2110 may be performed by a DCI outputting component 1530 as described with reference to FIG. 15.

At 2115, the method may include determining that a first DCI message of the set of multiple DCI messages is a temporally last DCI message before a processing deadline of the UE, where the first DCI message triggers the UE to perform the transmission-specific overlap resolution process on the first two or more overlapping transmissions. The operations of 2115 may be performed in accordance with examples as disclosed herein. In some examples, aspects of the operations of 2115 may be performed by a first DCI component 1535 as described with reference to FIG. 15.

The following provides an overview of aspects of the present disclosure:

Aspect 1: A method for wireless communication at a UE, comprising: receiving a first indication of a default overlap resolution process for application by the UE on a plurality of overlapping transmissions; receiving one or more first DCI messages of a plurality of DCI messages that collectively schedule the plurality of overlapping transmissions; determining, based at least in part on a processing deadline having passed for multiplexing the plurality of overlapping transmissions, the one or more first DCI messages received prior to the processing deadline, whether any one of the one or more first DCI messages includes a second indication of a transmission-specific overlap resolution process for application by the UE on a first two or more overlapping transmissions of the plurality of overlapping transmissions; and performing a determined overlap resolution process comprising either the transmission-specific overlap resolution process indicated by one of the one or more first DCI messages or the default overlap resolution process.

Aspect 2: The method of aspect 1, wherein determining whether any one of the one or more first DCI messages includes the second indication comprises: determining that a triggering DCI message of the one or more first DCI messages includes the second indication of the transmission-specific overlap resolution process, wherein the transmission-specific overlap resolution process is the determined overlap resolution process based at least in part on the second indication being included in any of the one or more first DCI messages.

Aspect 3: The method of aspect 2, wherein the triggering DCI message is a temporally last DCI message of the one or more first DCI messages.

Aspect 4: The method of aspect 1, wherein determining whether any one of the one or more first DCI messages includes the second indication comprises: determining that the one or more first DCI messages fail to include the second indication of the transmission-specific overlap resolution process, wherein the default overlap resolution process is the determined overlap resolution process based at least in part on the second indication not being included in any of the one or more first DCI messages.

Aspect 5: The method of any of aspects 1 through 4, wherein performing the determined overlap resolution process further comprises: performing one of a multiplexing process or a prioritization process as part of the determined overlap resolution process.

Aspect 6: The method of aspect 5, wherein performing one of the multiplexing process or the prioritization process further comprises: performing the multiplexing process, which includes: multiplexing the plurality of overlapping transmissions regardless of a priority index associated with each overlapping transmission of the plurality of overlapping transmissions.

Aspect 7: The method of aspect 5, wherein performing one of the multiplexing process or the prioritization process further comprises: performing the prioritization process, which includes: prioritizing each of the plurality of overlapping transmissions based at least in part on a respective priority index associated with each overlapping transmission of the plurality of overlapping transmissions.

Aspect 8: The method of aspect 7, further comprising: multiplexing at least two overlapping transmissions of the plurality of overlapping transmissions, the at least two overlapping transmissions associated with a first priority index; and refraining from transmitting remaining overlapping transmissions of the plurality of overlapping transmissions, the remaining overlapping transmissions associated with a second priority index.

Aspect 9: The method of aspect 8, wherein refraining from transmitting the remaining overlapping transmissions comprises: dropping the remaining overlapping transmissions subsequent to the processing deadline.

Aspect 10: The method of any of aspects 8 through 9, wherein the first priority index corresponds to a high priority and the second priority index corresponds to a low priority which is less than the high priority.

Aspect 11: The method of aspect 1, further comprising: determining that a second DCI message of the plurality of DCI messages includes the second indication of the transmission-specific overlap resolution process, the second DCI message received after the processing deadline and scheduling an additional transmission of the plurality of overlapping transmissions; determining that the second indication of the transmission-specific overlap resolution process included in the second DCI message indicates a prioritization process and that the determined overlap resolution process is also the prioritization process; and performing the determined overlap resolution process for the additional transmission based at least in part on the determined overlap resolution process being the prioritization process and being consistent with the second indication included in the second DCI message.

Aspect 12: The method of aspect 11, wherein performing the determined overlap resolution process comprises: performing the prioritization process, which includes: prioritizing each of the plurality of overlapping transmissions based at least in part on a respective priority index associated with each overlapping transmission of the plurality of overlapping transmissions; and multiplexing at least two overlapping transmissions of the plurality of overlapping transmissions based at least in part on the second DCI message being received prior to a second processing deadline, wherein the at least two overlapping transmissions are associated with a first priority index.

Aspect 13: The method of aspect 1, further comprising: determining that a second DCI message of the plurality of DCI messages includes the second indication of the transmission-specific overlap resolution process, the second DCI message received after the processing deadline and scheduling an additional transmission of the plurality of overlapping transmissions; determining that the second indication of the transmission-specific overlap resolution process included in the second DCI message indicates a prioritization process and that the determined overlap resolution process is a multiplexing process; and refraining from transmitting the additional transmission and from monitoring for one or more additional DCI messages based at least in part on the determined overlap resolution process being the multiplexing process and being inconsistent with the second indication included in the second DCI message.

Aspect 14: The method of any of aspects 1 through 13, further comprising: determining that a second DCI message of the plurality of DCI messages includes the second indication of the transmission-specific overlap resolution process, the second DCI message received after the processing deadline and scheduling an additional transmission of the plurality of overlapping transmissions; determining that the second indication of the transmission-specific overlap resolution process included in the second DCI message indicates a multiplexing process; and refraining from transmitting the additional transmission and from monitoring for one or more additional DCI messages based at least in part on the second indication of the transmission-specific overlap resolution process included in the second DCI message indicating a multiplexing process.

Aspect 15: A method for wireless communication at a network entity, comprising: outputting an RRC message including a first indication of a default overlap resolution process for application by a UE on a plurality of overlapping transmissions; and outputting one or more DCI messages of a plurality of DCI messages that collectively schedule the plurality of overlapping transmissions, the one or more DCI messages including a second indication of a transmission-specific overlap resolution process for application by the UE on a first two or more overlapping transmissions of the plurality of overlapping transmissions.

Aspect 16: The method of aspect 15, further comprising: determining that a first DCI message of the plurality of DCI messages is a temporally last DCI message before a processing deadline of the UE, wherein the first DCI message triggers the UE to perform the transmission-specific overlap resolution process on the first two or more overlapping transmissions.

Aspect 17: The method of aspect 16, further comprising: outputting a second DCI message of the one or more DCI messages that includes the second indication of the transmission-specific overlap resolution process, wherein the second DCI message triggers the UE to perform the transmission-specific overlap resolution process on an additional transmission scheduled by the second DCI message based at least in part on the second DCI message being received at the UE after the processing deadline, and the second indication of the transmission-specific overlap resolution process included in both the second DCI message and the first DCI message indicating a prioritization process.

Aspect 18: The method of aspect 16, further comprising: outputting a second DCI message of the one or more DCI messages that includes the second indication of the transmission-specific overlap resolution process, wherein the second DCI message triggers the UE to refrain from transmitting an additional transmission scheduled by the second DCI message and from monitoring for one or more additional DCI messages based at least in part on the second DCI message being received at the UE after the processing deadline, the second indication of the transmission-specific overlap resolution process included in the second DCI message indicating a prioritization process, and the second indication of the transmission-specific overlap resolution process included in the first DCI message indicating a multiplexing process.

Aspect 19: The method of any of aspects 16 through 18, further comprising: outputting a second DCI message of the one or more DCI messages that includes the second indication of the transmission-specific overlap resolution process, wherein the second DCI message triggers the UE to refrain from transmitting an additional transmission scheduled by the second DCI message and from monitoring for one or more additional DCI messages based at least in part on the second DCI message being received at the UE after the processing deadline and the second indication of the transmission-specific overlap resolution process indicating a multiplexing process.

Aspect 20: The method of aspect 15, wherein the RRC message triggers the UE to perform the default overlap resolution process based at least in part on the UE failing to receive a DCI message of the one or more DCI messages that includes the second indication of the transmission-specific overlap resolution process prior to a processing deadline.

Aspect 21: The method of any of aspects 15 through 20, wherein the transmission-specific overlap resolution process comprises either a multiplexing process or a prioritization process.

Aspect 22: The method of aspect 21, wherein the transmission-specific overlap resolution process comprises the multiplexing process, and the multiplexing process comprises multiplexing the plurality of overlapping transmissions regardless of a priority index associated with each overlapping transmission of the plurality of overlapping transmissions.

Aspect 23: The method of aspect 21, wherein the transmission-specific overlap resolution process comprises the prioritization process, and the prioritization process comprises prioritizing each of the plurality of overlapping transmissions based at least in part on a respective priority index associated with each overlapping transmission of the plurality of overlapping transmissions.

Aspect 24: The method of aspect 23, wherein the prioritization process further comprises multiplexing at least two overlapping transmissions of the plurality of overlapping transmissions, the at least two overlapping transmissions associated with a first priority index, and refraining from transmitting remaining overlapping transmissions of the plurality of overlapping transmissions, the remaining overlapping transmissions associated with a second priority index.

Aspect 25: The method of aspect 24, wherein refraining from transmitting the remaining overlapping transmissions comprises dropping the remaining overlapping transmissions subsequent to a processing deadline.

Aspect 26: The method of any of aspects 24 through 25, wherein the first priority index corresponds to a high priority and the second priority index corresponds to a low priority which is less than the high priority.

Aspect 27: An apparatus for wireless communication at a UE, comprising a processor; memory coupled with the processor; and instructions stored in the memory and executable by the processor to cause the apparatus to perform a method of any of aspects 1 through 14.

Aspect 28: An apparatus for wireless communication at a UE, comprising at least one means for performing a method of any of aspects 1 through 14.

Aspect 29: A non-transitory computer-readable medium storing code for wireless communication at a UE, the code comprising instructions executable by a processor to perform a method of any of aspects 1 through 14.

Aspect 30: An apparatus for wireless communication at a network entity, comprising a processor; memory coupled with the processor; and instructions stored in the memory and executable by the processor to cause the apparatus to perform a method of any of aspects 15 through 26.

Aspect 31: An apparatus for wireless communication at a network entity, comprising at least one means for performing a method of any of aspects 15 through 26.

Aspect 32: A non-transitory computer-readable medium storing code for wireless communication at a network entity, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a first indication of a default overlap resolution process for application by the UE on a plurality of overlapping transmissions;
receiving one or more first downlink control information messages of a plurality of downlink control information messages that collectively schedule the plurality of overlapping transmissions;
determining, based at least in part on a processing deadline having passed for multiplexing the plurality of overlapping transmissions, the one or more first downlink control information messages received prior to the processing deadline, whether any one of the one or more first downlink control information messages includes a second indication of a transmission-specific overlap resolution process for application by the UE on a first two or more overlapping transmissions of the plurality of overlapping transmissions; and
performing a determined overlap resolution process comprising either the transmission-specific overlap resolution process indicated by one of the one or more first downlink control information messages or the default overlap resolution process.

2. The method of claim 1, wherein determining whether any one of the one or more first downlink control information messages includes the second indication comprises:
determining that a triggering downlink control information message of the one or more first downlink control information messages includes the second indication of the transmission-specific overlap resolution process, wherein the transmission-specific overlap resolution process is the determined overlap resolution process based at least in part on the second indication being included in any of the one or more first downlink control information messages.

3. The method of claim 2, wherein the triggering downlink control information message is a temporally last downlink control information message of the one or more first downlink control information messages.

4. The method of claim 1, wherein determining whether any one of the one or more first downlink control information messages includes the second indication comprises:
determining that the one or more first downlink control information messages fail to include the second indication of the transmission-specific overlap resolution process, wherein the default overlap resolution process is the determined overlap resolution process based at least in part on the second indication not being included in any of the one or more first downlink control information messages.

5. The method of claim 1, wherein performing the determined overlap resolution process further comprises:
performing one of a multiplexing process or a prioritization process as part of the determined overlap resolution process.

6. The method of claim 5, wherein performing one of the multiplexing process or the prioritization process further comprises:
performing the multiplexing process, which includes:
multiplexing the plurality of overlapping transmissions regardless of a priority index associated with each overlapping transmission of the plurality of overlapping transmissions.

7. The method of claim 5, wherein performing one of the multiplexing process or the prioritization process further comprises:
performing the prioritization process, which includes:
prioritizing each of the plurality of overlapping transmissions based at least in part on a respective priority index associated with each overlapping transmission of the plurality of overlapping transmissions.

8. The method of claim 7, further comprising:
multiplexing at least two overlapping transmissions of the plurality of overlapping transmissions, the at least two overlapping transmissions associated with a first priority index; and
refraining from transmitting remaining overlapping transmissions of the plurality of overlapping transmissions, the remaining overlapping transmissions associated with a second priority index.

9. The method of claim 8, wherein refraining from transmitting the remaining overlapping transmissions comprises:
dropping the remaining overlapping transmissions subsequent to the processing deadline.

10. The method of claim 8, wherein the first priority index corresponds to a high priority and the second priority index corresponds to a low priority which is less than the high priority.

11. The method of claim 1, further comprising:
determining that a second downlink control information message of the plurality of downlink control information messages includes the second indication of the transmission-specific overlap resolution process, the second downlink control information message received after the processing deadline and scheduling an additional transmission of the plurality of overlapping transmissions;
determining that the second indication of the transmission-specific overlap resolution process included in the second downlink control information message indicates a prioritization process and that the determined overlap resolution process is also the prioritization process; and
performing the determined overlap resolution process for the additional transmission based at least in part on the determined overlap resolution process being the prioritization process and being consistent with the second indication included in the second downlink control information message.

12. The method of claim 11, wherein performing the determined overlap resolution process comprises:
performing the prioritization process, which includes:
prioritizing each of the plurality of overlapping transmissions based at least in part on a respective priority index associated with each overlapping transmission of the plurality of overlapping transmissions; and
multiplexing at least two overlapping transmissions of the plurality of overlapping transmissions based at least in part on the second downlink control information message being received prior to a second processing deadline, wherein the at least two overlapping transmissions are associated with a first priority index.

13. The method of claim 1, further comprising:
determining that a second downlink control information message of the plurality of downlink control information messages includes the second indication of the transmission-specific overlap resolution process, the second downlink control information message received after the processing deadline and scheduling an additional transmission of the plurality of overlapping transmissions;

determining that the second indication of the transmission-specific overlap resolution process included in the second downlink control information message indicates a prioritization process and that the determined overlap resolution process is a multiplexing process; and refraining from transmitting the additional transmission and from monitoring for one or more additional downlink control information messages based at least in part on the determined overlap resolution process being the multiplexing process and being inconsistent with the second indication included in the second downlink control information message.

14. The method of claim 1, further comprising:
determining that a second downlink control information message of the plurality of downlink control information messages includes the second indication of the transmission-specific overlap resolution process, the second downlink control information message received after the processing deadline and scheduling an additional transmission of the plurality of overlapping transmissions;

determining that the second indication of the transmission-specific overlap resolution process included in the second downlink control information message indicates a multiplexing process; and refraining from transmitting the additional transmission and from monitoring for one or more additional downlink control information messages based at least in part on the second indication of the transmission-specific overlap resolution process included in the second downlink control information message indicating the multiplexing process.

15. A method for wireless communication at a network entity, comprising:
outputting a radio resource control message including a first indication of a default overlap resolution process for application by a user equipment (UE) on a plurality of overlapping transmissions;

outputting one or more downlink control information messages of a plurality of downlink control information messages that collectively schedule the plurality of overlapping transmissions, the one or more downlink control information messages including a second indication of a transmission-specific overlap resolution process for application by the UE on a first two or more overlapping transmissions of the plurality of overlapping transmissions, and determining that a first downlink control information message of the plurality of downlink control information messages is a temporally last downlink control information message before a processing deadline of the UE, wherein the first downlink control information message triggers the UE to perform the transmission-specific overlap resolution process on the first two or more overlapping transmissions.

16. The method of claim 15, further comprising:
outputting a second downlink control information message of the one or more downlink control information messages that includes the second indication of the transmission-specific overlap resolution process, wherein the second downlink control information message triggers the UE to perform the transmission-specific overlap resolution process on an additional transmission scheduled by the second downlink control information message based at least in part on the second downlink control information message being received at the UE after the processing deadline, and the second indication of the transmission-specific overlap resolution process included in both the second downlink control information message and the first downlink control information message indicating a prioritization process.

17. The method of claim 15, further comprising:
outputting a second downlink control information message of the one or more downlink control information messages that includes the second indication of the transmission-specific overlap resolution process, wherein the second downlink control information message triggers the UE to refrain from transmitting an additional transmission scheduled by the second downlink control information message and from monitoring for one or more additional downlink control information messages based at least in part on the second downlink control information message being received at the UE after the processing deadline, the second indication of the transmission-specific overlap resolution process included in the second downlink control information message indicating a prioritization process, and the second indication of the transmission-specific overlap resolution process included in the first downlink control information message indicating a multiplexing process.

18. The method of claim 15, further comprising:
outputting a second downlink control information message of the one or more downlink control information messages that includes the second indication of the transmission-specific overlap resolution process, wherein the second downlink control information message triggers the UE to refrain from transmitting an additional transmission scheduled by the second downlink control information message and from monitoring for one or more additional downlink control information messages based at least in part on the second downlink control information message being received at the UE after the processing deadline and the second indication of the transmission-specific overlap resolution process indicating a multiplexing process.

19. The method of claim 15, wherein the transmission-specific overlap resolution process comprises either a multiplexing process or a prioritization process.

20. The method of claim 19, wherein:
the transmission-specific overlap resolution process comprises the multiplexing process, and
the multiplexing process comprises multiplexing the plurality of overlapping transmissions regardless of a priority index associated with each overlapping transmission of the plurality of overlapping transmissions.

21. The method of claim 19, wherein:
the transmission-specific overlap resolution process comprises the prioritization process, and
the prioritization process comprises prioritizing each of the plurality of overlapping transmissions based at least in part on a respective priority index associated with each overlapping transmission of the plurality of overlapping transmissions.

22. The method of claim 21, wherein the prioritization process further comprises multiplexing at least two overlapping transmissions of the plurality of overlapping transmissions, the at least two overlapping transmissions associated with a first priority index, and refraining from transmitting remaining overlapping transmissions of the plurality of overlapping transmissions, the remaining overlapping transmissions associated with a second priority index.

23. The method of claim 22, wherein refraining from transmitting the remaining overlapping transmissions comprises dropping the remaining overlapping transmissions subsequent to a processing deadline.

24. The method of claim 22, wherein the first priority index corresponds to a high priority and the second priority index corresponds to a low priority which is less than the high priority.

25. An apparatus for wireless communication at a user equipment (UE), comprising:
one or more processor;
memory coupled with the one or more processor; and
instructions stored in the memory and executable by the one or more processor to cause the apparatus to:
receive a first indication of a default overlap resolution process for application by the UE on a plurality of overlapping transmissions;
receive one or more first downlink control information messages of a plurality of downlink control information messages that collectively schedule the plurality of overlapping transmissions;
determine, based at least in part on a processing deadline having passed for multiplexing the plurality of overlapping transmissions, the one or more first downlink control information messages received prior to the processing deadline, whether any one of the one or more first downlink control information messages includes a second indication of a transmission-specific overlap resolution process for application by the UE on a first two or more overlapping transmissions of the plurality of overlapping transmissions; and
perform a determined overlap resolution process comprising either the transmission-specific overlap resolution process indicated by one of the one or more first downlink control information messages or the default overlap resolution process.

26. The apparatus of claim 25, wherein the instructions to determine whether any one of the one or more first downlink control information messages includes the second indication are executable by the one or more processor to cause the apparatus to:
determine that a triggering downlink control information message of the one or more first downlink control information messages includes the second indication of the transmission-specific overlap resolution process, wherein the transmission-specific overlap resolution process is the determined overlap resolution process based at least in part on the second indication being included in any of the one or more first downlink control information messages.

27. An apparatus for wireless communication at a network entity, comprising:
one or more processor;
memory coupled with the one or more processor; and
instructions stored in the memory and executable by the one or more processor to cause the apparatus to:
output a radio resource control message including a first indication of a default overlap resolution process for application by a user equipment (UE) on a plurality of overlapping transmissions;
output one or more downlink control information messages of a plurality of downlink control information messages that collectively schedule the plurality of overlapping transmissions, the one or more downlink control information messages including a second indication of a transmission-specific overlap resolution process for application by the UE on a first two or more overlapping transmissions of the plurality of overlapping transmissions, and
determine that a first downlink control information message of the plurality of downlink control information messages is a temporally last downlink control information message before a processing deadline of the UE, wherein the first downlink control information message triggers the UE to perform the transmission-specific overlap resolution process on the first two or more overlapping transmissions.

\* \* \* \* \*